United States Patent
Wang et al.

(10) Patent No.: US 12,436,298 B2
(45) Date of Patent: Oct. 7, 2025

(54) CARRIER SIGNAL POSITIONING

(71) Applicant: QUALCOMM Incorporated, San Diego, CA (US)

(72) Inventors: Min Wang, Tustin, CA (US); Chandrasekhar Jayaram, Bangalore (IN); Satya Swaroop Yadati, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 17/947,099

(22) Filed: Sep. 17, 2022

(65) Prior Publication Data

US 2024/0094414 A1   Mar. 21, 2024

(51) Int. Cl.
*G01S 19/44* (2010.01)
*G01S 19/32* (2010.01)

(52) U.S. Cl.
CPC .............. *G01S 19/44* (2013.01); *G01S 19/32* (2013.01)

(58) Field of Classification Search
CPC .................................. G01S 19/44; G01S 19/32
See application file for complete search history.

(56) References Cited

U.S. PATENT DOCUMENTS

| | | | |
|---|---|---|---|
| 2011/0181462 A1* | 7/2011 | Lawrence | G01S 19/44 |
| | | | 342/357.26 |
| 2017/0269216 A1* | 9/2017 | Dai | G01S 19/05 |
| 2020/0096647 A1* | 3/2020 | Cookman | H04J 13/0022 |

FOREIGN PATENT DOCUMENTS

CN   103348261 B  *  9/2015  ........... G01S 19/072

OTHER PUBLICATIONS

International Search Report and Written Opinion—PCT/US2023/028966—ISA/EPO—Jun. 19, 2024.
Li Bofeng., et al., "GNSS Ambiguity Resolution with Controllable Failure Rate for Long Baseline Network RTK", Journal of Geodesy, vol. 88, No. 2, Nov. 15, 2013, pp. 99-112, XP055598406, Berlin/Heidelberg, pp. 104, left-hand column, section 4.1 Partial AR for ambiguity subset selected with the successive increased elevations.

(Continued)

*Primary Examiner* — William Kelleher
*Assistant Examiner* — Ismaaeel A. Siddiquee
(74) *Attorney, Agent, or Firm* — Thien T. Nguyen

(57) ABSTRACT

An integer ambiguity resolution method includes: receiving SPS signals; determining, for the SPS signals, candidate float ambiguity values indicative of float numbers of carrier signal wavelengths of the SPS signals between respective satellite sources, of the SPS signals, and the mobile device; and performing, in response to failure of an integer ambiguity resolution validation check based on at least a first subset of the candidate float ambiguity values, an integer ambiguity search using at least a second subset of the candidate float ambiguity values; wherein each candidate float ambiguity value of the at least second subset of the candidate float ambiguity values corresponds to a second indication of candidate float ambiguity accuracy that is higher than a first indication of candidate float ambiguity accuracy, if any, corresponding to the at least first subset of the candidate float ambiguity values.

16 Claims, 10 Drawing Sheets

(56) References Cited

OTHER PUBLICATIONS

Parkins A., "Increasing GNSS RTK Availability with a New Single-epoch Batch Partial Ambiguity Resolution Algorithm", GPS Solutions, Springer, Berlin, DE, vol. 15, No. 4, Dec. 22, 2010, pp. 1-12, XP019956752, abstract, pp. 394.
Partial International Search Repor—PCT/US2023/028966—ISA/EPO—Dec. 6, 2023.
Teunissen P.J.G., et al., "Geometry-free Ambiguity Success Rates in Case of Partial Fixing", NTM 1999—Proceedings of the 1999 National Technical Meeting of the Institute of Navigation, the Institute of Navigation, 8551 Rixlew Lane Suite 360 Manassas, VA 20109, USA, Jan. 27, 1999, 7 pages, XP056005920, abstract, pp. 201-204.

\* cited by examiner

CARRIER SIGNAL POSITIONING

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

An example mobile device includes: a satellite positioning system receiver configured to receive a plurality of satellite positioning system (SPS) signals; a memory; and a processor communicatively coupled to the satellite positioning system receiver and the memory, wherein the processor is configured to: determine, for the plurality of SPS signals, a plurality of candidate float ambiguity values indicative of float numbers of carrier signal wavelengths of the plurality of SPS signals between respective satellite sources, of the plurality of SPS signals, and the mobile device; and perform, in response to failure of an integer ambiguity resolution validation check based on at least a first subset of the plurality of candidate float ambiguity values, an integer ambiguity search using at least a second subset of the plurality of candidate float ambiguity values; wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

An example integer ambiguity resolution method includes: receiving, at a mobile device, a plurality of SPS signals; determining, for the plurality of SPS signals, a plurality of candidate float ambiguity values indicative of float numbers of carrier signal wavelengths of the plurality of SPS signals between respective satellite sources, of the plurality of SPS signals, and the mobile device; and performing, in response to failure of an integer ambiguity resolution validation check based on at least a first subset of the plurality of candidate float ambiguity values, an integer ambiguity search using at least a second subset of the plurality of candidate float ambiguity values; wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

Another example mobile device includes: means for receiving a plurality of SPS signals; means for determining, for the plurality of SPS signals, a plurality of candidate float ambiguity values indicative of float numbers of carrier signal wavelengths of the plurality of SPS signals between respective satellite sources, of the plurality of SPS signals, and the mobile device; and means for performing, in response to failure of an integer ambiguity resolution validation check based on at least a first subset of the plurality of candidate float ambiguity values, an integer ambiguity search using at least a second subset of the plurality of candidate float ambiguity values; wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

An example non-transitory, processor-readable storage medium includes processor-readable instructions to cause one or more processors of a mobile device to: receive a plurality of SPS signals; determine, for the plurality of SPS signals, a plurality of candidate float ambiguity values indicative of float numbers of carrier signal wavelengths of the plurality of SPS signals between respective satellite sources, of the plurality of SPS signals, and the mobile device; and perform, in response to failure of an integer ambiguity resolution validation check based on at least a first subset of the plurality of candidate float ambiguity values, an integer ambiguity search using at least a second subset of the plurality of candidate float ambiguity values; wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

DETAILED DESCRIPTION

Figure 1:
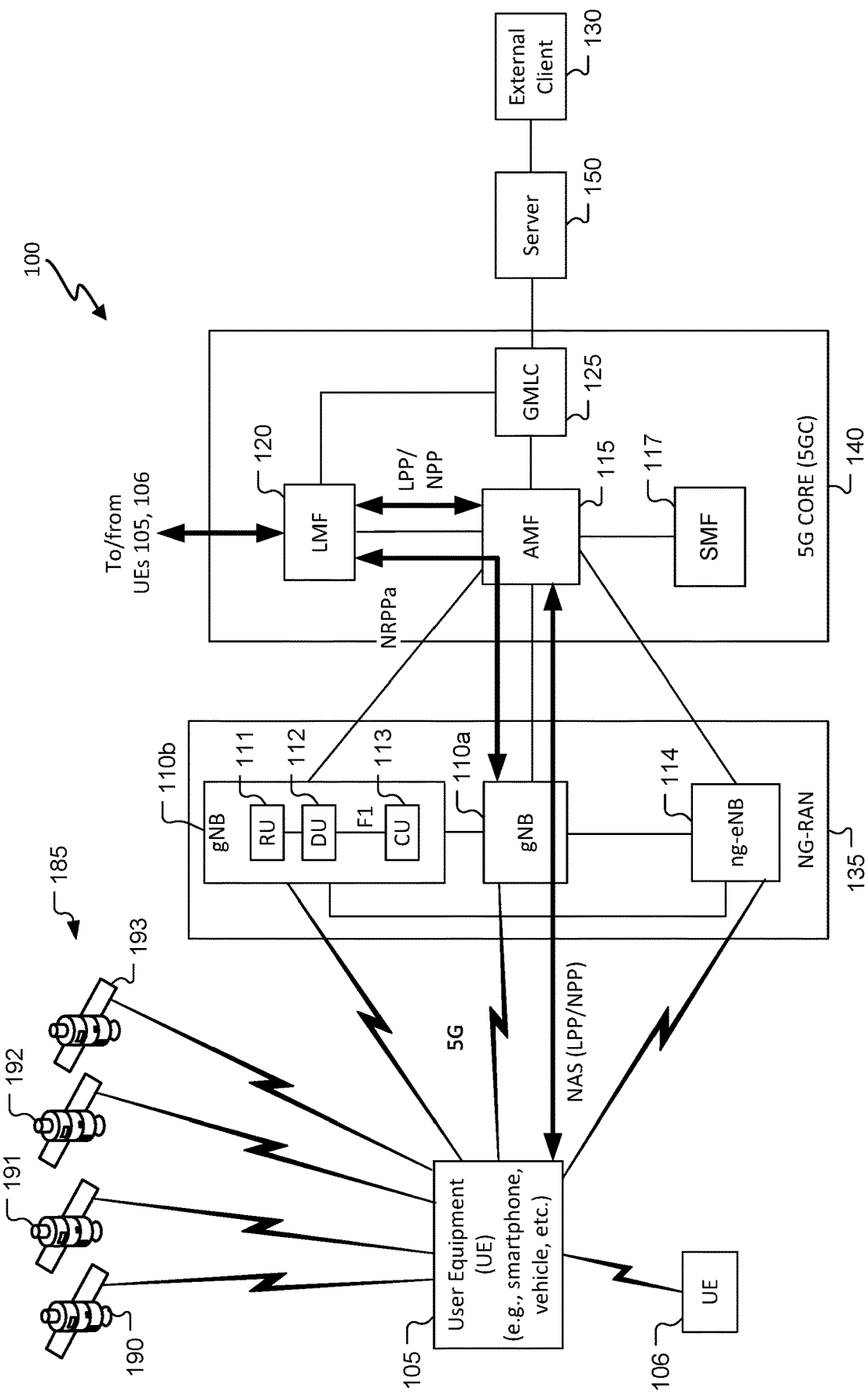
FIG. 1 is a simplified diagram of an example wireless communications system.

Techniques are discussed herein for mobile device positioning using integer ambiguity resolution to determine integer numbers of full cycles of carrier signals between transmitter (e.g., a satellite) and receiver (e.g., a user equipment). For example, satellite positioning system signals may be used to determine quantities of wavelengths of carrier signals between satellites and a mobile device. Ambiguity searches may be performed to resolve integer ambiguities in the quantities of wavelengths. In response to failing to validate results of an ambiguity search, more and more stringent metric threshold(s) may be applied to one or more signal metrics to determine which satellite signals to use to determine the wavelength quantities, and thus to use to determine position of the mobile device. Candidate float ambiguities of multiple signals from the same satellites and of multiple frequency bands may be used to determine combined-frequency candidate float ambiguities that are used to determine "fixed" combined-frequency integer ambiguities (i.e., integer wavelength quantities) that are used to determine position estimates for the mobile device. The fixed combined-frequency integer ambiguities, e.g., a position estimate based on such integer ambiguities, may be used to determine individual-frequency band ambiguities and to restrict use of information corresponding individual-band satellite signals based on quality of the individual-frequency band ambiguities (e.g., closeness to respective integers). These are examples, and other examples may be implemented.

Items and/or techniques described herein may provide one or more of the following capabilities, as well as other capabilities not mentioned. Accuracy (and confidence in the accuracy) of integer ambiguity resolution of carrier signal wavelengths between satellites and mobile devices may be improved, increasing accuracy (and confidence in the accuracy) of position estimates for the mobile device. Ambiguity convergence time may be reduced, e.g., from tens of minutes to a few minutes or even less than a minute. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Obtaining the locations of mobile devices may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points.

The description herein may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11 (Institute of Electrical and Electronics Engineers 802.11), etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device.

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies, e.g., to determine and/or provide location information for the UE 105. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114.

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

With a UE-based position method, the UE 105 may obtain location measurements and may compute a location of the UE 105 (e.g., with the help of assistance data received from a location server such as the LMF 120 or broadcast by the gNBs 110a, 110b, the ng-eNB 114, or other base stations or APs). The UE 105 may provide the location of the UE 105 to the server 150, e.g., directly and/or via a base station, such that the server 150 can provide location information to a location client.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP (LTE Positioning Protocol) and/or NPP (New Radio Positioning Protocol) message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (Observed Time Difference Of Arrival) (or some other position method).

Figure 2:
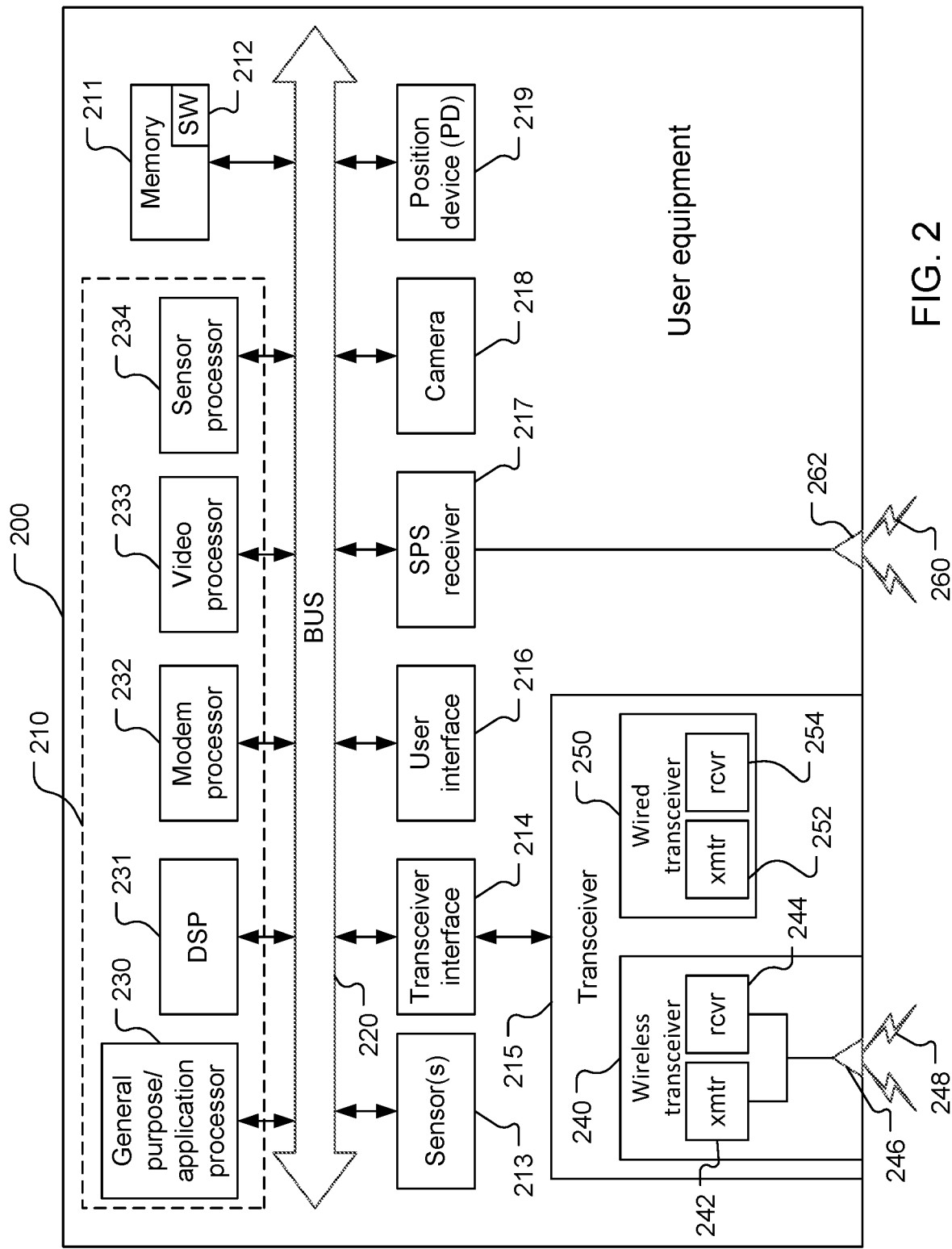
FIG. 2 is a block diagram of components of an example user equipment shown in FIG. 1.

Referring also to FIG. 2, a UE 200 may be an example of one of the UEs 105, 106 and may comprise a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 may be a non-transitory storage medium that may include random access memory (RAM), flash memory, disc memory, and/or read-only memory (ROM), etc. The memory 211 may store the software 212 which may be processor-readable, processor-executable software code containing instructions that may be configured to, when executed, cause the processor 210 to perform various functions described herein. Alternatively, the software 212 may not be directly executable by the processor 210 but may be configured to cause the processor 210, e.g., when compiled and executed, to perform the functions. The description herein may refer to the processor 210 performing a function, but this includes other implementations such as where the processor 210 executes software and/or firmware. The description herein may refer to the processor 210 performing a function as shorthand for one or more of the processors 230-234 performing the function. The description herein may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE may include one or more of the processors 230-234 of the processor 210, the memory 211, and the wireless transceiver 240. Other example configurations may include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be unconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and may report the relative displacement/distance (e.g., via dead reckoning, or sensor-based location determination, or sensor-assisted location determination enabled by the sensor(s) 213). In another example, for relative positioning information, the sensors/IMU may be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (Vehicle-to-Everything) (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
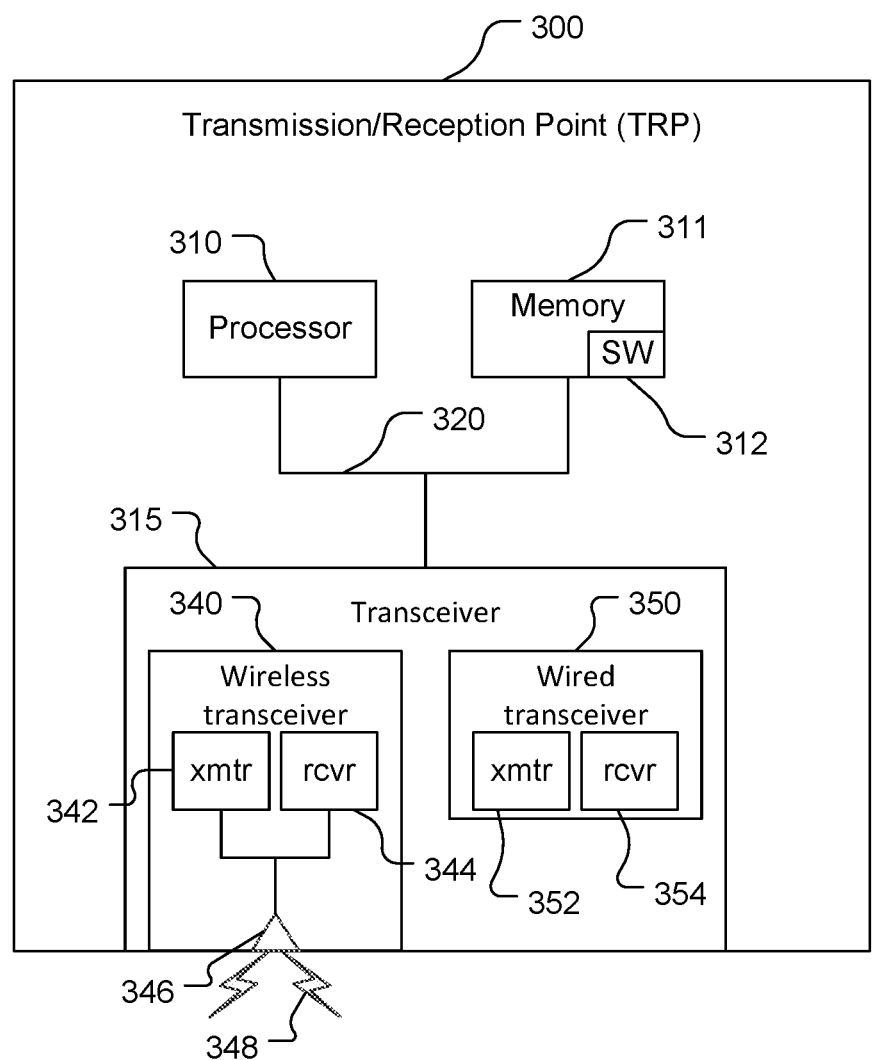
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 may be a non-transitory storage medium that may include random access memory (RAM)), flash memory, disc memory, and/or read-only memory (ROM), etc. The memory 311 may store the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description herein may refer to the processor 310 performing a function, but this includes other implementations such as where the processor 310 executes software and/or firmware. The description herein may refer to the processor 310 performing a function as shorthand for one or more of the processors contained in the processor 310 performing the function. The description herein may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 may be configured to perform or performs several functions, but one or more of these functions may be performed by the LMF 120 and/or the UE 200 (i.e., the LMF 120 and/or the UE 200 may be configured to perform one or more of these functions).

Figure 4:
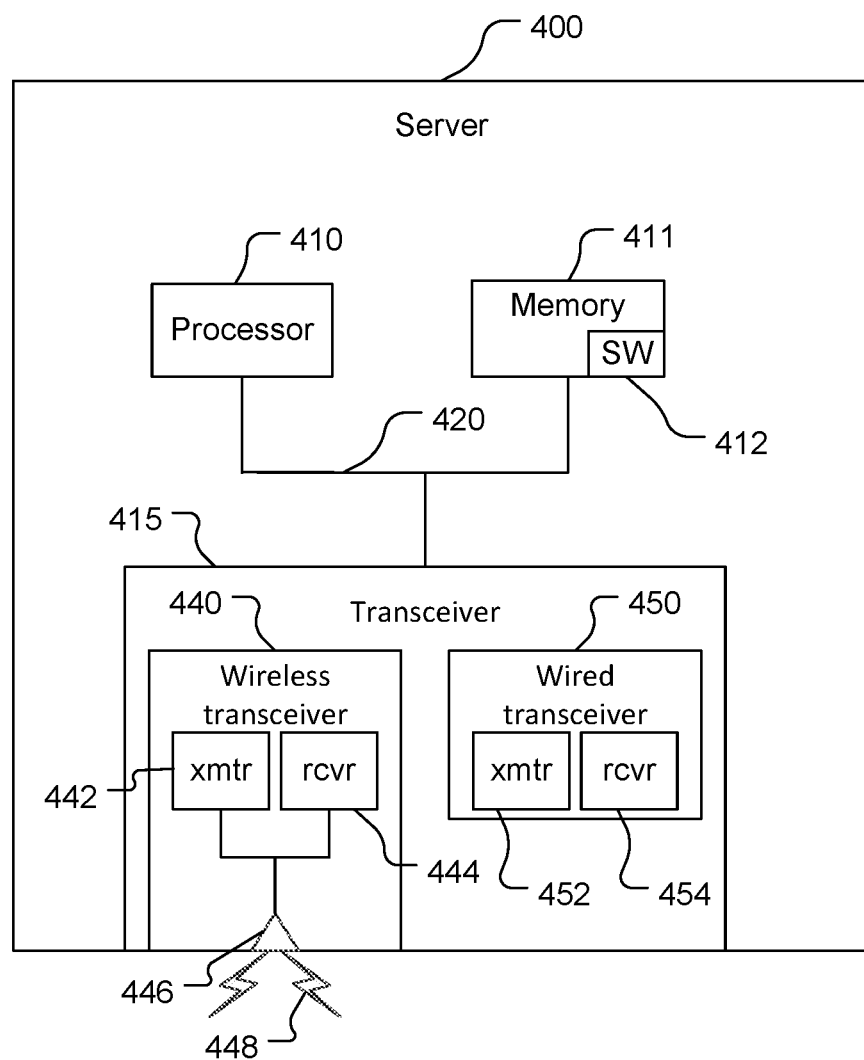
FIG. 4 is a block diagram of components of an example server, various embodiments of which are shown in FIG. 1.

Referring also to FIG. 4, a server 400, of which the LMF 120 may be an example, may comprise a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 may be a non-transitory storage medium that may include random access memory (RAM)), flash memory, disc memory, and/or read-only memory (ROM), etc. The memory 411 may store the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description herein may refer to the processor 410 performing a function, but this includes other implementations such as where the processor 410 executes software and/or firmware. The description herein may refer to the processor 410 performing a function as shorthand for one or more of the processors contained in the processor 410 performing the function. The description herein may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

SPS Positioning Techniques

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the assistance data to other UEs that have not paid for the subscription, with the assistance data being passed on each time the assistance data changes.

The SPS receiver 217 may be enabled to receive signals associated with one or more SPS/GNSS resources. Received SPS/GNSS signals may be stored in the memory 211 and/or used by processor(s) 210 to determine a position of UE the 200. The SPS receiver 217 may include a code phase receiver and a carrier phase receiver, which may measure carrier wave related information. The carrier wave, which typically has a much higher frequency than the pseudo random noise (PRN) (code phase) sequence that the carrier wave conveys, may facilitate more accurate position determination. The term "code-phase measurements" refers to measurements using a Coarse Acquisition (C/A) code receiver, which uses the information contained in the PRN sequence to calculate the position of the UE 200. The SPS receiver 217 may be included in a mobile device such as a vehicle, a mobile handset, a laptop, a computer, a tablet, an aerial vehicle or drone, or other SPS-enabled mobile device.

Figure 5:
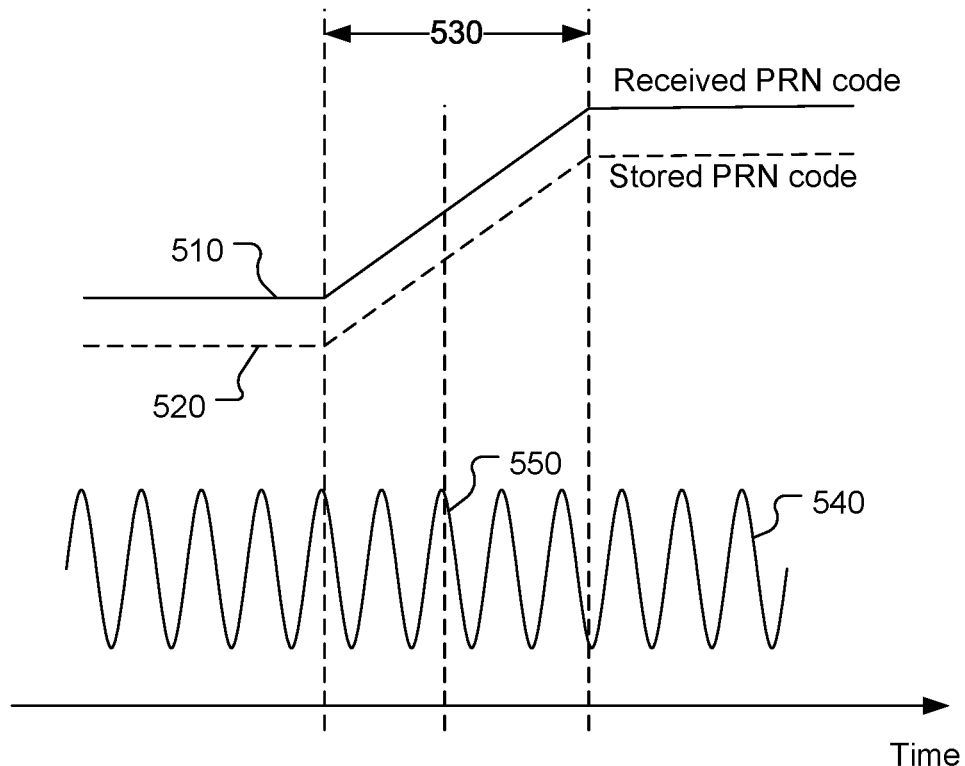
FIG. 5 is a timing diagram of a code phase signal transition and a carrier signal.

Referring also to FIG. 5, the code phase receiver may align a received PRN code 510 with a stored PRN code 520. For simplicity of the diagram, modulation of a carrier signal 540 to produce the PRN code is not shown. Alignment of the received PRN code 510 with the stored code 520 may reveal a time of receipt of the received PRN code 510, within a time window 530, to determine a range between a satellite and the UE 200, with multiple ranges between the UE 200 and multiple satellites used to determine the position of the UE 200, e.g., with 1-5 m accuracy. The phase of the carrier signal 540 conveying the PRN code 510 may be analyzed to determine a finer-resolution accuracy of the timing of arrival of a satellite signal at the UE 200, and thus the range between satellite and the UE 200, and consequently a more accurate position estimate of the UE 200, e.g., less than 1 m (e.g., decimeters). For example, phase of the carrier signal 540 conveying the PRN code 510 may be analyzed for the window 530 to determine more accurately a timing of an edge of the received PRN code 510, in this example a cycle 550 being identified as the edge of a PRN code transition. The term "carrier-phase measurements" refers to measurements using a carrier phase receiver, which uses the carrier signal to calculate positions. The carrier signal may take the form, for example for GPS, of an L1 signal at 1575.42 MHz, or an L2 signal at 1227.60 MHz, or an L5 signal at 1176 MHz. Other examples include one or more signals for Galileo and/or or Beidou systems (e.g., B1I, B1C, B2A, E1, E5A, etc.). A single satellite may transmit signals in different bands, e.g., L1 and L2, and/or L1 and L5.

Figure 6:
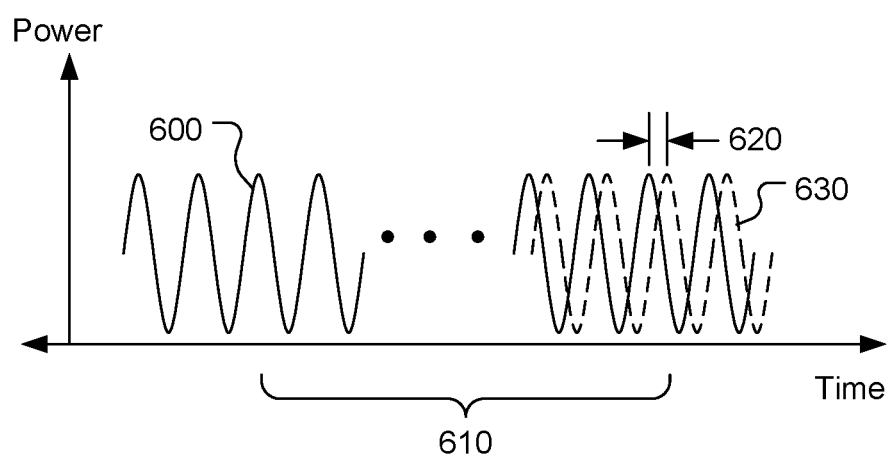
FIG. 6 is a diagram of power distribution of a satellite signal as a function of frequency, and indications of possible interference signals.

Referring also to FIG. 6, a carrier signal 600 may be measured and a time of flight 610 between a transmitting satellite and a receiving UE may be determined. The time of flight 610 may be converted into a distance, and this distance, along with other distances to other satellites, may be used in conjunction with known locations of the satellites to determine a position estimate for the UE. Cycles of the carrier signal 600 are similar, such that distinguishing cycles is difficult. A phase difference 620 between the carrier signal 600 and a local replica signal 630 (a replica of the carrier signal 600) may be measured as a fraction of a cycle. The measured phase difference 620 accounts for a portion of the time of flight 610, with the remainder of the time of flight 610 being an unknown integer number of full cycles of the carrier signal 600, called an integer ambiguity. If the integer ambiguity is resolved (and thus the integer number of full cycles of the carrier signal 600 in the time of flight 610 determined), then the distance between the satellite and the UE may be determined and used to determine a position estimate for the UE. Because GNSS signals are RHCP signals (right hand circularly polarized signals), the phase difference 620 may be determined precisely, e.g., within 1% of a cycle, if a circularly polarized receive antenna is used. Linearly-polarized antennas, e.g., as often used in mobile phones, may have lower quality (e.g., worse phase center offset (PCO) and/or worse phase center variation (PCV) than circularly-polarized antennas (e.g., as often used in automobiles). Mobile phones often also have lower carrier-to-noise ratio of measured signals compared to automobiles, e.g., due to signal blockages more often encountered by mobile phones than automobiles. Lower antenna quality and/or lower received signal quality may make integer ambiguity resolution more difficult, and thus may make determining a position estimate more difficult.

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Integer Ambiguity Resolution

Successful integer ambiguity resolution (TAR) may enable RTK to achieve centimeter-level accuracy of position estimates for a UE. Any of various techniques may be employed to determine candidate float ambiguity values (i.e., candidate float values of numbers of carrier signal cycles between transmitter and receiver), also called float ambiguities. Ambiguity float candidates may be used in an ambiguity search to attempt to finalize the integer values of full cycles of carrier signals between satellites and a UE. For example, a LAMBDA (least-squares ambiguity decorrelation adjustment) technique may be used as an ambiguity search function. Float values (i.e., values that may be non-integer values) of candidate ambiguities corresponding to multiple satellites, along with a covariance matrix of the float values (indicative of uncertainty for each candidate ambiguity and correlation between the candidate ambiguities) may be used as inputs to the ambiguity search function. The ambiguity search function may resolve the integer ambiguity to determine the integer number of full cycles of a carrier signal between transmitter (e.g., satellite) and receiver (e.g., UE).

Figure 7:
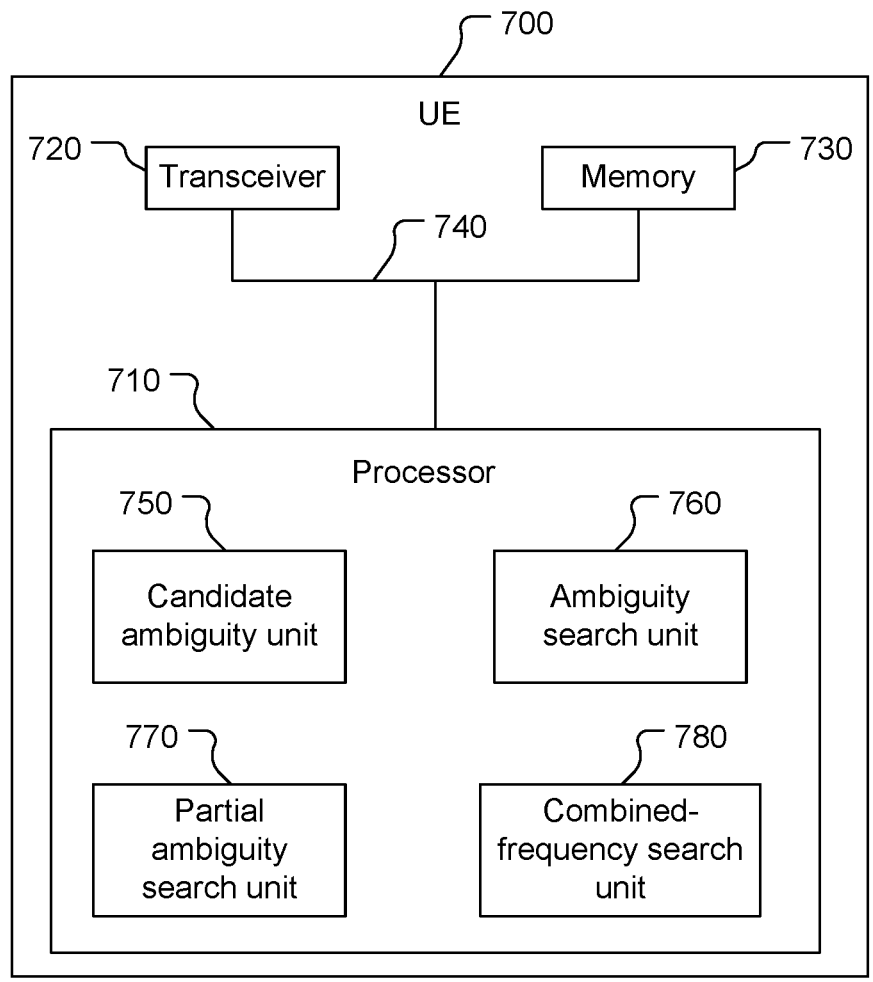
FIG. 7 is a simplified block diagram of an example user equipment.

Referring to FIG. 7, a UE 700 may include a processor 710, a transceiver 720, and a memory 730 communicatively coupled to each other by a bus 740. The UE 700 may include the components shown in FIG. 7, and may include one or more other components such as any of those shown in FIG. 2 such that the UE 200 may be an example of the UE 700. For example, the processor 710 may include one or more of the components of the processor 210. The transceiver 720 may include the SPS antenna 262 and one or more components of the SPS receiver 217, and may include one or more components of the transceiver 215, e.g., the wireless transmitter 242 and the antenna 246, or the wireless receiver 244 and the antenna 246, or the wireless transmitter 242, the wireless receiver 244, and the antenna 246, or the wired transmitter 252 and/or the wired receiver 254. The memory 730 may be configured similarly to the memory 211, and may include software with processor-readable instructions configured to cause the processor 710 to perform functions.

The description herein may refer to the processor 710 performing a function, but this may include other implementations such as where the processor 710 may execute software (stored in the memory 730) and/or firmware. The description herein may refer to the UE 700 performing a function as shorthand for one or more appropriate components (e.g., the processor 710 and the memory 730) of the UE 700 performing the function. The processor 710 (possibly in conjunction with the memory 730 and, as appropriate, the transceiver 720) may include a candidate ambiguity unit 750, an ambiguity search unit 760, a partial ambiguity search unit 770, and a combined frequency search unit 780. The candidate ambiguity unit 750, the ambiguity search unit 760, the partial ambiguity search unit 770, and the combined frequency search unit 780 are discussed further below. The description may refer to the processor 710 generally, or the UE 700 generally, as performing any of the functions of the candidate ambiguity unit 750, the ambiguity search unit 760, the partial ambiguity search unit 770, and/or the combined frequency search unit 780, with the UE 700 configured to perform the functions discussed.

The candidate ambiguity unit 750 may be configured to perform one or more of a variety of known techniques for determining candidate ambiguity values. For example, the candidate ambiguity unit 750 may receive GNSS signal measurements from the transceiver 720 (e.g., the SPS receiver 217) and may use the GNSS signal measurements to determine float candidate ambiguity values. Each of the float candidate ambiguity values may include an integer portion and a fractional portion indicative of a number of cycles of a carrier signal between the UE 700 and a respective satellite that transmitted the respective GNSS signal. A set of float candidate ambiguity values corresponding to a set of satellites may be called an ambiguity float vector. The candidate ambiguity unit 750 may provide the ambiguity float vector and a corresponding covariance matrix. For example, the candidate ambiguity unit 750 may ignore the integer nature of carrier signal ambiguities and apply, for example, a least-squares parameter estimation to yield the ambiguity float vector along with the covariance matrix.

The ambiguity search unit 760 may be configured to determine a validated, or "fixed," set of integer ambiguity values of respective carrier signal travel distances between respective satellites and the UE 700. The ambiguity search unit 760 may, for example, implement the LAMBDA search popularized by Delft University. The ambiguity search unit 760 may use the ambiguity float vector and corresponding covariance matrix as inputs, and output a set of best integer values for the number of full cycles of respective GNSS signals between respective satellites and the UE 700, and a set of second-best integer values. The ambiguity search unit 760 may attempt to validate the set of best integer values. For example, the ambiguity search unit 760 may perform a ratio test by finding a ratio of a value derived from the set of best integer values divided by a value derived from the set of second-best integer values. If the resulting ratio is above a ratio threshold value, then the set of best integer values is validated, and the best integer values become validated (or "fixed") integer values (which are integers, not float values). As another example, the ambiguity search unit 760 may apply a success rate test alone or in combination with the ratio test to validate integer values.

The partial ambiguity search unit 770 may be configured to implement a partial ambiguity search by selecting a subset of candidate float ambiguity values of the ambiguity float vector for use by the ambiguity search unit 760 to perform an ambiguity search to determine the validated integer values. This may improve an ability to determine a set of valued integer values, e.g., to improve a fixing engagement rate (i.e., the rate at which the ambiguity search unit 760 is able to determine validated integer values). For example, the partial ambiguity search unit 770 may be configured to select the subset of candidate ambiguity values based on signal quality of received GNSS signals corresponding to the candidate ambiguity values. Also or alternatively, the partial ambiguity search unit 770 may be configured to select the subset of candidate ambiguity values based on satellite elevations relative to the UE 700 of the satellites transmitting the received GNSS signals. Also or alternatively, the partial ambiguity search unit 770 may be configured to select the subset of candidate ambiguity values based on whether candidate ambiguities, as modified based on a position estimate derived from combining GNSS signals of different frequencies from the same satellite, are closer than a threshold value to integer values.

Figure 8:
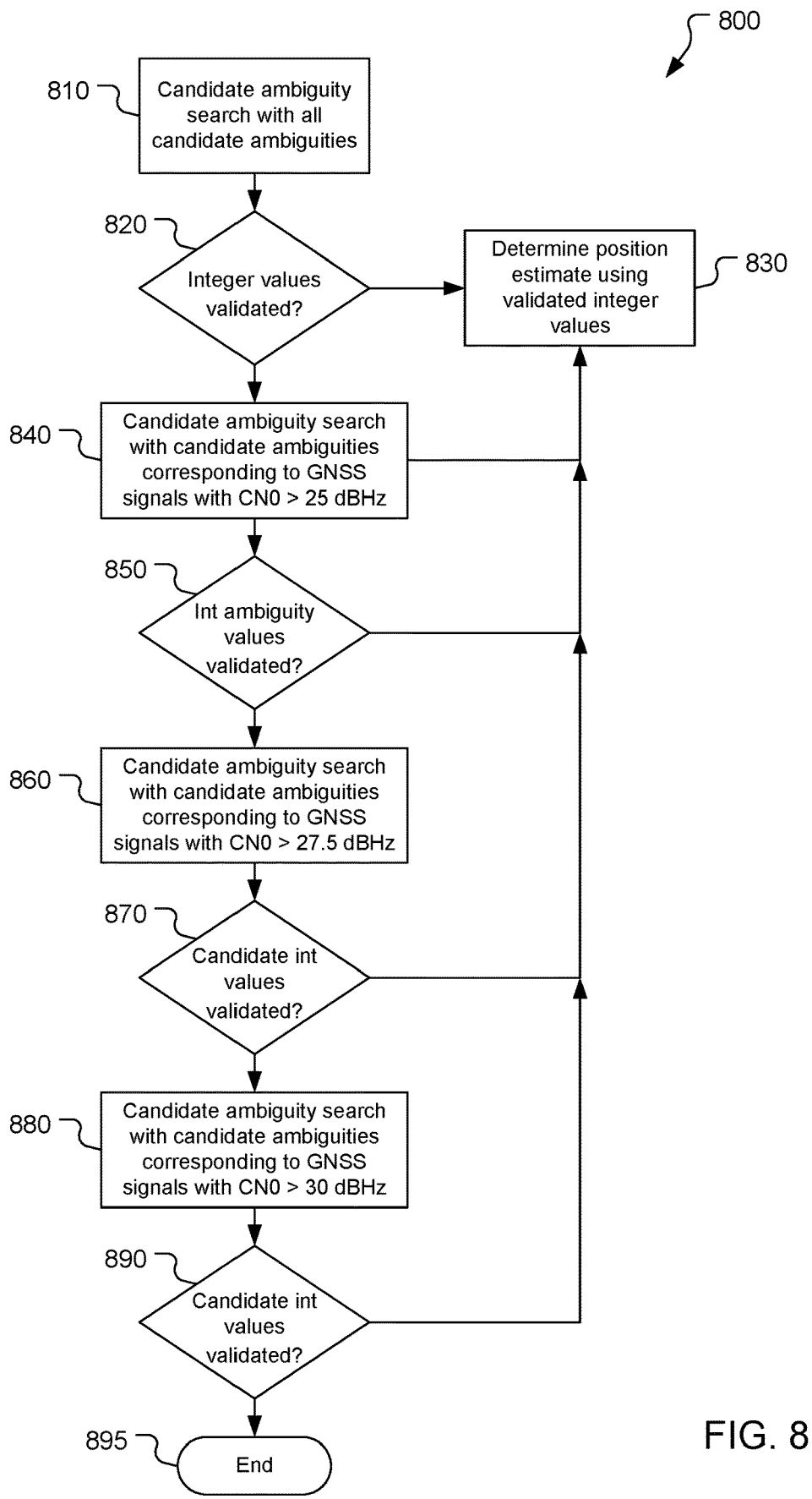
FIG. 8 is a block diagram of a method of selecting a subset of candidate ambiguity values in a cascading manner and determining a position estimate.

Referring also to FIG. 8, a method 800 of selecting a subset of candidate ambiguity values in a cascading manner and determining a position estimate may include the stages shown. In the method 800, the subset of candidate ambiguity values is selected based on different levels of quality of received GNSS signals corresponding to the candidate ambiguity values. The method 800 uses a cascading approach, responding to a failed attempt to determined validated integer values by increasing a minimum quality metric, here CN0, of GNSS signals corresponding to float ambiguity values to be used to determine fixed integer values for determining ranges between satellites and a UE, and thus determining a position estimate of the UE. The method 800 is, however, an example and not limiting. The method 800 may be altered, e.g., by having stages added, removed, rearranged, combined, performed concurrently, and/or having single stages split into multiple stages. For example, more or fewer than three stages of increasing quality thresholds may be used to select a subset of candidate ambiguity values. As another example, values of quality thresholds discussed with respect to stages 840, 860, 880 are examples, and other quality threshold values may be used. Still other examples are possible.

At stage 810, the method 800 includes performing a candidate ambiguity search with all of the float candidate ambiguity values of the ambiguity float vector. For example, the partial ambiguity search unit 770 may provide the ambiguity float vector (and corresponding covariance matrix) to the ambiguity search unit 760 without applying a CN0 (carrier-to-noise density) mask, i.e., without requiring any minimum CN0 of a GNSS signal corresponding to any of the float candidate ambiguity values provided to the ambiguity search unit 760. The ambiguity search unit 760 performs an ambiguity search (e.g., a LAMBDA search) with the provided float candidate ambiguity values and covariance matrix to determine sets of the best and second-best integer values.

At stage 820, the method 800 includes determining whether the integer values are validated. For example, the ambiguity search unit 760 performs a validation check, e.g., a ratio test on the sets of the best and second-best integer values, to determine whether the set of the best integer values is validated. If the integer values are validated, then the method 800 proceeds to stage 830 where the validated integer values are used, e.g., by the processor 710, to determine ranges to satellites and, from these ranges, a position estimate for the UE 700. If the integer values are not validated, then the method 800 proceeds to stage 840.

At stage 840, the method 800 includes performing a candidate ambiguity search with all of the float candidate ambiguity values of the ambiguity float vector whose corresponding GNSS signals are received with at least a first threshold quality metric value. Thus, an ambiguity search is limited to using GNSS signals with a corresponding indication of candidate ambiguity accuracy that is higher than any such indication corresponding to the GNSS signals used in the previous ambiguity search. The indication of candidate ambiguity accuracy is an indication of a GNSS signal metric that corresponds to an ability to accurately resolve the integer ambiguity. For example, the partial ambiguity search unit 770 may provide, to the ambiguity search unit 760, only the float candidate ambiguity values of the ambiguity float vector (and corresponding covariance matrix) that have corresponding GNSS signals that are received with at least a first threshold value of CN0, e.g., 25 dBHz. The provided float candidate ambiguity values may be a null set if no GNSS signals were received with at least the threshold CN0 value. The provided float candidate ambiguity values may be a subset of the ambiguity float vector if at least one, but fewer than all, of candidate ambiguity values of the ambiguity float vector had corresponding GNSS signal(s) with at least the first threshold CN0. The provided float candidate ambiguity values may be the entire ambiguity float vector if all of the candidate float ambiguity values of the ambiguity float vector correspond to GNSS signals with at least the first threshold CN0. The ambiguity search unit 760 performs an ambiguity search with the provided float candidate ambiguity values and corresponding covariance matrix to determine sets of the best and second-best integer values.

At stage 850, the method 800 includes determining whether integer values provided by the partial ambiguity search unit 770 at stage 840 are validated. For example, the ambiguity search unit 760 performs a validation check, e.g., a ratio test on the sets of the best and second-best integer values determined at stage 840, to determine whether the set of the best integer values determined at stage 840 is validated. If the integer values are validated, then the method 800 proceeds to stage 830 where the validated integer values are used, e.g., by the processor 710, to determine ranges to satellites and, from these ranges, a position estimate for the UE 700. If the integer values are not validated, then the method 800 proceeds to stage 860.

At stage 860, the method 800 includes performing a candidate ambiguity search with all of the float candidate ambiguity values of the ambiguity float vector whose corresponding GNSS signals are received with at least a second threshold quality metric value. For example, the partial ambiguity search unit 770 may provide, to the ambiguity search unit 760, only the float candidate ambiguity values of the ambiguity float vector (and corresponding covariance matrix) that have corresponding GNSS signals that are received with at least a first threshold value of CN0, e.g., 27.5 dBHz. The ambiguity search unit 760 performs an ambiguity search with the provided float candidate ambiguity values and corresponding covariance matrix to determine sets of the best and second-best integer values.

At stage 870, the method 800 includes determining whether integer values provided by the partial ambiguity search unit 770 at stage 860 are validated. If the integer values are validated, then the method 800 proceeds to stage 830 where the validated integer values are used, e.g., by the processor 710, to determine ranges to satellites and, from these ranges, a position estimate for the UE 700. If the integer values are not validated, then the method 800 proceeds to stage 880.

At stage 880, the method 800 includes performing a candidate ambiguity search with all of the float candidate ambiguity values of the ambiguity float vector whose corresponding GNSS signals are received with at least a third threshold quality metric value. For example, the partial ambiguity search unit 770 may provide, to the ambiguity search unit 760, only the float candidate ambiguity values of the ambiguity float vector (and corresponding covariance matrix) that have corresponding GNSS signals that are received with at least a first threshold value of CN0, e.g., 30 dBHz. The ambiguity search unit 760 performs an ambiguity search with the provided float candidate ambiguity values and corresponding covariance matrix to determine sets of the best and second-best integer values.

At stage 890, the method 800 includes determining whether integer values provided by the partial ambiguity search unit 770 at stage 880 are validated. If the integer values are validated, then the method 800 proceeds to stage 830 where the validated integer values are used, e.g., by the processor 710, to determine ranges to satellites and, from these ranges, a position estimate for the UE 700. If the integer values are not validated, then the method 800 proceeds to stage 895 where the method 800 ends.

Figure 9:
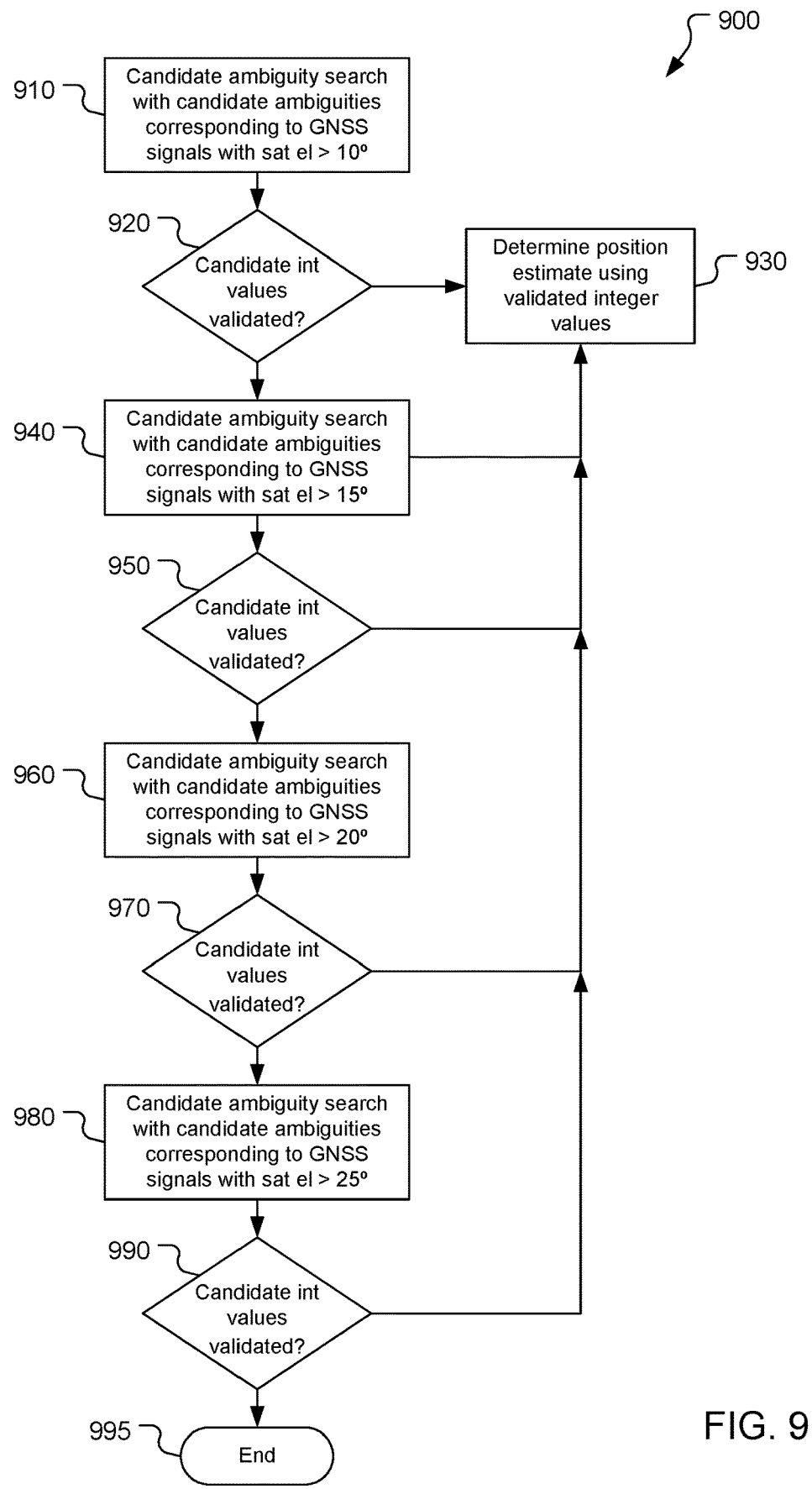
FIG. 9 is a block diagram of another method of selecting a subset of candidate ambiguity values in a cascading manner and determining a position estimate.

Referring also to FIG. 9, a method 900 of selecting a subset of candidate ambiguity values in a cascading manner and determining a position estimate may include the stages shown. In the method 900, the subset of candidate ambiguity values is selected based on different elevations, relative to the UE 700, of satellites corresponding to received GNSS signals corresponding to the candidate ambiguity values. The method 900 uses a cascading approach, responding to a failed attempt to determined validated integer values by increasing a minimum quality metric, here satellite elevation, of GNSS signals corresponding to float ambiguity values to be used to determine fixed integer values for determining ranges between satellites and a UE, and thus determining a position estimate of the UE. The method 900 is, however, an example and not limiting. The method 900 may be altered, e.g., by having stages added, removed, rearranged, combined, performed concurrently, and/or having single stages split into multiple stages. For example, more or fewer than three stages of increasing elevation thresholds may be used to select a subset of candidate ambiguity values. As another example, values of elevation thresholds discussed with respect to stages 910, 940, 960, 980 are examples, and other elevation threshold values may be used. Still other examples are possible.

At stage 910, the method 900 includes performing a candidate ambiguity search with all of the float candidate ambiguity values of the ambiguity float vector whose corresponding GNSS signals are received from satellites that have elevations relative to the UE 700 of at least a first threshold elevation (with elevation being an angle from the UE 700 to a respective satellite relative to the horizon). For example, the partial ambiguity search unit 770 may provide, to the ambiguity search unit 760, only the float candidate ambiguity values of the ambiguity float vector (and corresponding covariance matrix) that have corresponding GNSS signals that are received from satellites that have at least a first threshold elevation, e.g., 10° (above the horizon). The provided float candidate ambiguity values may be a null set if no GNSS signals were received from satellites with at least the first threshold elevation. The provided float candidate ambiguity values may be a subset of the ambiguity float vector if at least one, but fewer than all, of candidate ambiguity values of the ambiguity float vector had corresponding GNSS signal(s) received from satellites with at least the first threshold elevation. The provided float candidate ambiguity values may be the entire ambiguity float vector if all of the candidate ambiguity values of the ambiguity float vector correspond to GNSS signals received from satellites with at least the first threshold elevation. The ambiguity search unit 760 performs an ambiguity search (e.g., a LAMBDA search) with the provided float candidate ambiguity values and corresponding covariance matrix to determine sets of the best and second-best integer values.

At stage 920, the method 900 includes determining whether integer values are validated. For example, the ambiguity search unit 760 performs a validation check, e.g., a ratio test on the sets of the best and second-best integer values determined at stage 910, to determine whether the set of the best integer values is validated. If the integer values are validated, then the method 900 proceeds to stage 930 where the validated integer values are used, e.g., by the processor 710, to determine ranges to satellites and, from these ranges, a position estimate for the UE 700. If the integer values are not validated, then the method 900 proceeds to stage 940.

At stage 940, the method 900 includes performing a candidate ambiguity search with all of the float candidate ambiguity values of the ambiguity float vector whose corresponding GNSS signals are received from satellites that have elevations relative to the UE 700 of at least a second threshold elevation. Thus, an ambiguity search is limited to using GNSS signals with a corresponding indication of candidate ambiguity accuracy that is higher than any such indication corresponding to the GNSS signals used in the previous ambiguity search. For example, the partial ambiguity search unit 770 may provide, to the ambiguity search unit 760, only the float candidate ambiguity values of the ambiguity float vector (and corresponding covariance matrix) that have corresponding GNSS signals that are received from satellites that have at least a second threshold elevation, e.g., 15°. The ambiguity search unit 760 performs an ambiguity search with the provided float candidate ambiguity values and corresponding covariance matrix to determine sets of the best and second-best integer values.

At stage 950, the method 900 includes determining whether integer values provided by the partial ambiguity search unit 770 at stage 940 are validated. For example, the ambiguity search unit 760 performs a validation check, e.g., a ratio test on the sets of the best and second-best integer values determined at stage 940, to determine whether the set of the best integer values determined at stage 940 is validated. If the integer values are validated, then the method 900 proceeds to stage 930 where the validated integer values are used, e.g., by the processor 710, to determine ranges to satellites and, from these ranges, a position estimate for the UE 700. If the integer values are not validated, then the method 900 proceeds to stage 960.

At stage 960, the method 900 includes performing a candidate ambiguity search with all of the float candidate ambiguity values of the ambiguity float vector whose corresponding GNSS signals are received from satellites that have elevations relative to the UE 700 of at least a third threshold elevation. For example, the partial ambiguity search unit 770 may provide, to the ambiguity search unit 760, only the float candidate ambiguity values of the ambiguity float vector (and corresponding covariance matrix) that have corresponding GNSS signals that are received from satellites that have at least a third threshold elevation, e.g., 20°. The ambiguity search unit 760 performs an ambiguity search with the provided float candidate ambiguity values and corresponding covariance matrix to determine sets of the best and second-best integer values.

At stage 970, the method 900 includes determining whether integer values provided by the partial ambiguity search unit 770 at stage 960 are validated. For example, the ambiguity search unit 760 performs a validation check, e.g., a ratio test on the sets of the best and second-best integer values determined at stage 960, to determine whether the set of the best integer values determined at stage 960 is validated. If the integer values are validated, then the method 900 proceeds to stage 930 where the validated integer values are used, e.g., by the processor 710, to determine ranges to satellites and, from these ranges, a position estimate for the UE 700. If the integer values are not validated, then the method 900 proceeds to stage 980.

At stage 980, the method 900 includes performing a candidate ambiguity search with all of the float candidate ambiguity values of the ambiguity float vector whose corresponding GNSS signals are received from satellites that have elevations relative to the UE 700 of at least a fourth threshold elevation. For example, the partial ambiguity search unit 770 may provide, to the ambiguity search unit 760, only the float candidate ambiguity values of the ambiguity float vector (and corresponding covariance matrix) that have corresponding GNSS signals that are received from satellites that have at least a fourth threshold elevation, e.g., 25°. The ambiguity search unit 760 performs an ambiguity search with the provided float candidate ambiguity values and corresponding covariance matrix to determine sets of the best and second-best integer values.

At stage 990, the method 900 includes determining whether integer values provided by the partial ambiguity search unit 770 at stage 980 are validated. For example, the ambiguity search unit 760 performs a validation check, e.g., a ratio test on the sets of the best and second-best integer values determined at stage 980, to determine whether the set of the best integer values determined at stage 980 is validated. If the integer values are validated, then the method 900 proceeds to stage 930 where the validated integer values are used, e.g., by the processor 710, to determine ranges to satellites and, from these ranges, a position estimate for the UE 700. If the integer values are not validated, then the method 900 proceeds to stage 995 where the method 900 ends.

The methods 800 and 900 are examples. Numerous variations of the method 800 and/or the method 900 may be implemented. For example, one or more different threshold values may be used for CN0 threshold(s) and/or elevation threshold(s). As another example, differences between different consecutive thresholds may be different (e.g., 2.5 dBHz between a first pair of consecutive thresholds and another difference, e.g., 3.2 dBHz between a second pair of consecutive thresholds). As another example, stage 810 may have a non-zero CN0 threshold. As another example, stage 910 may not require an elevation threshold. As another example, one or more stages may apply a combination of thresholds, e.g., 25 dBHz and 15° elevation to determine which of the float candidate ambiguity values of the ambiguity float vector to provide to the ambiguity search unit 760.

Use of the method 800 and/or the method 900 (or a combination thereof) may improve positioning accuracy and confidence in positioning accuracy. For example, by increasing the likelihood of accurate integer ambiguity resolution, by increasing the likely signal quality and thus measurement accuracy, in response to failed integer ambiguity resolution validation, the accuracy of integer ambiguity resolution may be improved, which may improve accuracy of position estimates for the UE 700 and confidence in the position estimate accuracy.

Referring to FIG. 7, the combined frequency search unit 780 may be configured to combine GNSS signals from the same satellite. The combined GNSS signals may be of different frequency bands, e.g., the L1 and L5 bands, the L1 and L2 bands, the BDS (Beidou Navigation Satellite System) B1I and B2A bands, the B1I and B2B bands, the B1C and B2A bands, the B1C and B2B bands, the Galileo E1 and E5A bands, or the E1 and E5B bands. A signal resulting from a combination of two signals, here GNSS signals, of different frequency bands may be called a combined-frequency signal or a wide-lane signal. Combined-frequency signals may have larger wavelengths than for individual uncombined GNSS signals of the uncombined frequency bands. For example, while uncombined signals may have wavelengths near 0.2m, a L1/L2 signal (i.e., a combined-frequency signal resulting from a combination of an L1 signal and an L2 signal) may have a wavelength of about 0.86m, an L1/L5 signal may have a wavelength of about 0.75m, a B1I/B2A signal may have a wavelength of about 0.78 m, a B1I/B2B signal may have a wavelength of about 0.85 m, a B1C/B2A signal may have a wavelength of about 0.75 m, a B1C/B2B signal may have a wavelength of about 0.81 m, a Galileo E1/E5A signal may have a wavelength of about 0.75 m, and an E1/E5B signal may have a wavelength of about 0.81 m. On a mobile platform (e.g., with a less robust antenna, e.g., a linearly-polarized antenna), there is a higher likelihood than for more robust receivers that carrier phase (CP) measurements will have larger residual errors on uncombined signal measurements. The larger wavelength of a combined-frequency signal, however, may enable easier integer ambiguity resolution than with smaller-wavelength uncombined signals. The percent impact of errors (e.g., due to spatial de-correlation with increased baseline length) on a combined-frequency signal is smaller than for uncombined signals. For example, ionospheric and tropospheric errors (e.g., of about 2 cm) are the same for uncombined signals and combined-frequency signals, but the relative error is smaller for combined-frequency signals. The lower percent impact of errors on combined-frequency signals may facilitate passing a validation check for float ambiguity values based on combined-frequency signals, and thus facilitate obtaining "fixed" integer ambiguity values (also called fixed ambiguity values), that are integers derived from the float ambiguity values. Phase difference measurement (similar to the phase difference 620) of combined-frequency signals may be about 1% of a cycle, resulting in a resolution of about 7-8 cm. Even with a higher noise level for a combined-frequency band compared to an individual frequency band, the noise level may be better than using a pseudorange, and positioning accuracy of about 10 cm may be achieved using combined-frequency analysis.

Figure 10:
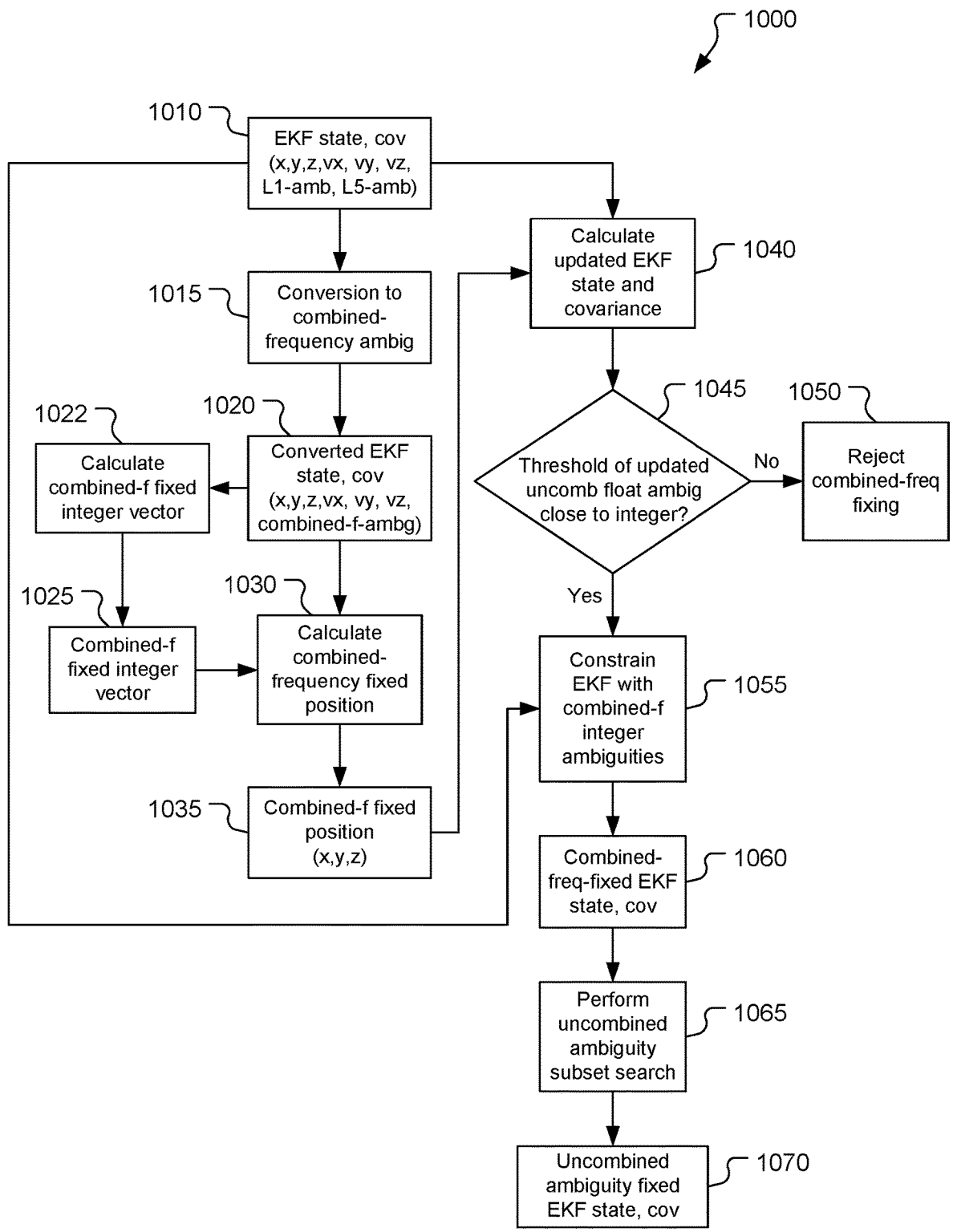
FIG. 10 is a block flow diagram of a method for leveraging combined-frequency signals to select float ambiguity values to use in an ambiguity search and/or to determine a position estimate for an apparatus.

Referring also to FIG. 10, a method 1000 for leveraging combined-frequency signals to select float ambiguity values to use in an ambiguity search and/or to determine a position estimate for an apparatus, e.g., the UE 700, may include the stages shown. The method 1000 is, however, an example and not limiting. The method 1000 may be altered, e.g., by having stages added, removed, rearranged, combined, performed concurrently, and/or having single stages split into multiple stages. The method 1000 may be performed as desired, e.g., in response to a request and/or in response to failure of results of an integer ambiguity search based on uncombined signals to be validated, e.g., for best and second-best sets of integer values to pass a ratio test. For example, the method 1000 may be performed in response to failure of the method 800 and/or the method 900 to yield validated integer values. Because using combined-frequency signals may yield float ambiguity values that are more likely to result in passing of a validity test, one or more criteria for passing the validity test may be made more stringent. For example, where combined-frequency signals are used to determine float ambiguity values, a threshold ratio for passing a ratio test may be increased (e.g., doubled) relative to a threshold ratio where uncombined signals are used to determine float ambiguity values. This may help balance an increased availability of fixed integer values resulting from using combined-frequency signals with reliability of those fixed integer values.

An Extended Kalman Filter (EKF) state and corresponding covariance may be provided by an EKF of the UE 700. The EKF is a Kalman Filter (KF) with a non-linear model implemented by the processor 710. The EKF state includes a position estimate for the UE 700, a velocity estimate for the UE 700, and float ambiguity values for multiple uncombined GNSS signals (e.g., an L1 signal and an L5 signal) for each of multiple satellites. In this example, the position may be provided in global coordinates, e.g., in terms of an x-coordinate, a y-coordinate, and a z-coordinate relative to an Cartesian coordinate system with an origin at a reference location. Also in this example, the velocity may be provided in global coordinate terms, e.g., in terms of an x-component of velocity (i.e., a speed in the x-direction), a y-component of velocity, and a z-component of velocity. The EKF state and covariance may be the output of an RTK process, and thus an RTK solution. The EKF state and covariance includes, in this example, two float ambiguity vectors each corresponding to a respective band of satellite signals. Example frequency bands may include GPS L1, GPS L2, BDS B1I (Beidou Navigation Satellite System) B1I, BDS B2A, BDS B1C, Galileo E1, Galileo E5A, or Galileo E5B. Each float ambiguity vector comprises a set of float ambiguity values, with each value corresponding to a respective satellite (and respective frequency band signal). For example, the L1-amb float vector comprises a set of float ambiguity values for L1 signals from a respective set of satellites. The different ambiguity vectors may have values corresponding to different sets of satellites (e.g., because some satellites may not transmit signals in both frequency bands and/or because some signals are not adequately received by the UE 700 (e.g., due to channel conditions, signal strength, etc.)). A simplified example of the L1-ambiguity vector may be (1.04, 1.22, 1.27, 1.18) and an example of the L5-ambiguity vector may be (1.12, 1.25, null, 1.09) with the float ambiguity values corresponding to satellites S1, S2, S3, S4. The null value in the third slot of the L5-ambiguity vector indicates that no L5 signal was received, or at least adequately received such that an ambiguity float value could be determined, from satellite S3.

At stage 1015, the ambiguity float vectors of an EKF state and covariance 1010 may be combined to determine combined-frequency ambiguity float vectors. The processor 710, e.g., the combined-frequency search unit 780, may perform a conversion (e.g., apply a conversion matrix) based on a correlation between frequency bands corresponding to the different ambiguity float vectors to map the EKF state and covariance 1010 to a converted EKF state and covariance 1020. The converted EKF state and covariance 1020 has the same position and velocity estimates as the EKF state and covariance 1010, but with a different covariance than the EKF state and covariance 1010, and with a combined-frequency ambiguity that is an ambiguity float vector for the combination of satellite signal frequency bands. A wavelength for the combined frequency bands is much larger than for either of the individual frequency bands. For example, while the wavelength for the L1 band is about 19 cm and the wavelength for the L5 band is about 24 cm, the wavelength for a combination of L1 and L5 is about 75 cm. For other frequency band combinations, other corresponding wavelengths are about 86 cm for an L1/L2 combination, about 78 cm for a B1I/B2A combination, about 85 cm for a B1I/B2B combination, about 75 cm for a B1C/B12A combination, about 81 cm for a B1C/B2B combination, about 75 cm for an E1/E5A combination, and about 81 cm for an E1/E5B combination. On a mobile platform (e.g., with a less robust antenna, e.g., a linearly-polarized antenna), there is a higher likelihood than for more robust receivers that carrier phase (CP) measurements will have larger residual errors on uncombined signal measurements. The use of combined-frequency ambiguities and processing using combined-frequency information may be referred to as wide-lane (WL) ambiguities or WL processing (e.g., WL search for integer ambiguity searching based on combined-frequency information). With a larger wavelength, resolving the integer ambiguity is easier, e.g., passing a validation check is easier and thus determining a "fixed" ambiguity value is easier than with a smaller wavelength signal. Also with a larger wavelength, a percent impact of errors (e.g., due to spatial de-correlation with increased baseline length) is smaller. For example, ionospheric and tropospheric errors are about 2 cm regardless of using combined-frequency analysis or individual-frequency analysis, but the relative error of about 2 cm is a much lower percentage with a combined-frequency wavelength of about 75 cm than with an individual-frequency wavelength of about 20 cm. The lower percent impact of errors on combined-frequency signals may facilitate passing a validation check for integer values based on combined-frequency signals, and thus facilitate obtaining "fixed" integer values. Phase difference measurement (similar to the phase difference 620) of combined-frequency signals may be about 1% of a cycle, resulting in a resolution of about 7-8 cm. Even with a higher noise level for a combined-frequency band compared to an individual-frequency band, the noise level is better than using a pseudorange, and positioning accuracy of about 10 cm may be achieved using combined-frequency analysis.

At stage 1022, the processor 710, e.g., the ambiguity search unit 760, may calculate a combined-frequency fixed integer vector 1025 from the combined-frequency ambiguity float vector and covariance matrix of the converted EKF state and covariance 1020. The ambiguity search unit 760 may perform a LAMBDA search and, if the resulting integer values are validated, output the combined-frequency fixed integer vector 1025. The combined-frequency fixed integer vector 1025 comprises integer values of the number of full wavelengths of respective carrier signals between respective satellites and the UE 700.

At stage 1030, the processor 710 may use the combined-frequency fixed integer vector 1025 and the converted EKF state and covariance 1020 to determine a position estimate of the UE 700. The processor 710 may use the combined-frequency fixed integer vector 1025 along with known locations of satellites corresponding to the combined-frequency fixed integer vector 1025 and position and velocity of the converted EKF state and covariance 1020 to determine the position estimate. This position estimate may be called a combined-frequency fixed position 1035, and may be more accurate than an ambiguity float solution. This is an intermediate position estimate and, due to uncertainty of the estimate, combined-frequency information is not yet used to constrain position estimate determination etc. (e.g., constrain the EKF), but may be used to constrain the position estimating (e.g., the EKF) if the uncertainty of combined-frequency information can be reduced as discussed below with respect to stages 1040, 1045.

At stage 1040, the processor 710 may calculate updated EKF state and covariance based on the combined-frequency fixed position 1035. The processor 710 may use the combined-frequency fixed position 1035 as a pseudomeasurement to constrain the position values (x, y, z) of the EKF state and covariance 1010. The processor 710 recomputes the EKF by using the EKF state and covariance 1010 and the combined-frequency fixed position 1035 as inputs to determine an updated EKF state and covariance. The updated EKF state and covariance is an intermediate set of values that includes updated uncombined float ambiguities (i.e., individual-frequency float ambiguity vectors for respective frequency bands), position values, velocity values, and a covariance matrix. If the combined-frequency fixed position 1035 is accurate, then many of the float ambiguity values of the updated uncombined float ambiguities should be close to integer values.

At stage 1045, the processor 710 may determine whether at least a threshold amount of the float ambiguity values calculated at stage 1040 are within a threshold difference from an integer. For example, the partial ambiguity search unit 770 may determine whether each of the updated uncombined float ambiguity values is within a threshold fraction of a cycle from an integer number of cycles, e.g., within 0.15 of an integer number of cycles. The partial ambiguity search unit 770 may determine whether at least a threshold amount (e.g., a threshold percentage) of the updated uncombined float ambiguity values are within the threshold fraction of respective integer numbers of cycles. The processor 710 may determine, for example, whether at least 80% of the float ambiguity values determined at stage 1040 are within 0.15 of an integer. If less than the threshold amount of the float ambiguity values calculated at stage 1040 are within the threshold difference from an integer, then the method 1000 proceeds to stage 1050 where the combined-frequency fixed position 1035 is rejected as an accurate position estimate and combined-frequency information. For example, the position 1035 and/or the combined-frequency fixed integer vectors 1025 may not be used to constrain the EKF for estimating location of the UE 700, may not be trusted, and/or may not be used for one or more applications that rely on a position estimate of the UE 700. If at least than the threshold amount of the float ambiguity values calculated at stage 1040 are within the threshold difference from an integer, then the combined-frequency fixed position is verified as being accurate and the method 1000 proceeds to stage 1055. Screening for closeness of the float ambiguity values to respective integers may help improve accuracy of resulting EKF states and thus accuracy of position estimates for the UE 700 and confidence in the accuracy of the position estimates.

At stage 1055, with the combined-frequency fixed position verified as being accurate (e.g., having at least a threshold accuracy corresponding to stages 1040, 1045), combined-frequency information may be used to constrain the determination of position estimate (e.g., constrain the EKF) using combined-frequency information. Having verified that the combined-frequency fixed position is accurate, the intermediate values determined at stage 1040, i.e., the updated EKF state and covariance, may be used to update the EKF, e.g., may be used to replace the EKF state and covariance 1010 and thus be used as a basis for future calculations by the EKF. For efficiency, instead of recomputing the EKF, the intermediate values determined at stage 1040 may be used as EKF output values, and thus used as the basis for future calculations by the EKF. The combined-frequency float ambiguity values determined at stage 1015 may be used in an ambiguity search to fix combined-frequency float ambiguity values to integers. These fixed integer values and the EKF output values, or at least the EKF output values corresponding to satellites from which signals of multiple frequency bands are received, may be used to produce (using the EKF) a combined-frequency-fixed EKF state and covariance 1060. The position estimate of the combined-frequency-fixed EKF state and covariance 1060 may be more accurate than the position estimate of the EKF state and covariance 1010. Even though the combined-frequency float ambiguity values have been fixed to integers, the uncombined (individual frequency band) float ambiguity values may not be integers. Further, there may be satellites from which only one individual frequency band signal is received (e.g., an L1 signal or an L5 signal, but not both). Thus, stage 1065 may be performed to fix uncombined float ambiguity values to integer values.

At stage 1065, an uncombined ambiguity subset search is performed. The processor 710, e.g., the partial ambiguity search unit 770, may determine the uncombined float ambiguity values that are within a threshold (e.g., within 0.15) of an integer. For a given satellite, there may be uncombined float ambiguity values for signals of different frequency bands or from a single frequency band. The processor 710, e.g., the ambiguity search unit 760, may perform an ambiguity search (e.g., LAMBDA search and validation) using the uncombined float ambiguity values that are within a threshold of an integer as determined at stage 1045. Thus, an ambiguity search is limited to using GNSS signals with a corresponding indication of integer ambiguity resolution accuracy (here, updated uncombined float ambiguity being within a threshold of an integer) that is higher than such indication, if any, corresponding to the GNSS signals used in a previous ambiguity search. This ambiguity search will fix the uncombined float ambiguity values to integer values. For the validation, the processor 710 may determine whether the results of the ambiguity search pass the ratio test. If the results pass the ratio test, then the processor 710 may determine whether one or more further validation tests are passed. For example, the processor 710 may determine whether one or more environmental conditions (e.g., open sky) are met, whether passing the ratio test is repeatable (e.g., one or more further ratio tests are passed), and/or whether results are within a threshold of an integer. The processor 710 may use, in the EKF, these uncombined fixed integer values to determine an uncombined ambiguity fixed EKF state and covariance 1070, including a position estimate for the UE 700. In this way, a fine resolution position estimate for the UE 700 may be obtained, with high confidence in the integer values of the uncombined signals (which have finer resolution than the combined-frequency signals).

Figure 11:
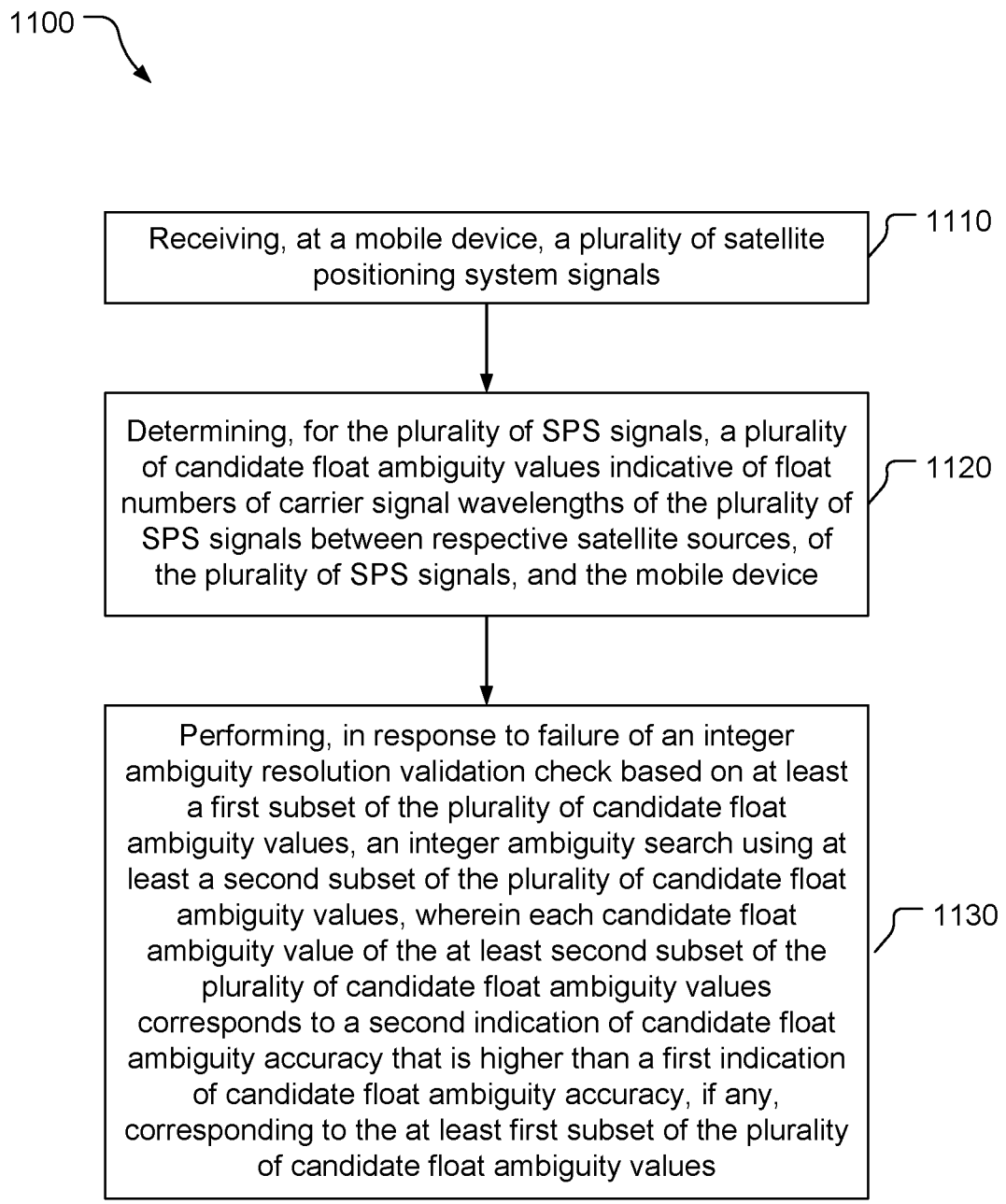
FIG. 11 is a block flow diagram of an integer ambiguity resolution method.

Referring to FIG. 11, with further reference to FIGS. 1-10, an integer ambiguity resolution method 1100 includes the stages shown. The method 1100 is, however, an example and not limiting. The method 1100 may be altered, e.g., by having one or more stages added, removed, rearranged, combined, performed concurrently, and/or having single stages split into multiple stages.

At stage 1110, the method 1100 includes receiving, at a mobile device, a plurality of satellite positioning system signals. For example, the UE 700 may receive the SPS signals 260 via the transceiver 720, e.g., the antenna 262 and the SPS receiver 217. The SPS signals 260 may include one or more signals from each of multiple satellites, with the SPS signals 260 being in one or more frequency bands. The antenna 262 and the SPS receiver 217, possibly in combination with the processor 710 and the memory 730, may comprise means for receiving the plurality of satellite positioning system signals.

At stage 1120, the method 1100 includes determining, for the plurality of SPS signals, a plurality of candidate float ambiguity values indicative of float numbers of carrier signal wavelengths of the plurality of SPS signals between respective satellite sources, of the plurality of SPS signals, and the mobile device. For example, the candidate ambiguity unit 750 determines candidate ambiguity float vectors with candidate float ambiguity values corresponding to the plurality of SPS signals received. The candidate float ambiguity values indicate float values of quantities of wavelengths of carrier signals between respective satellites and the UE 700. The processor 710, possibly in combination with the memory 730, may comprise means for determining the plurality of candidate float ambiguity values.

At stage 1130, the method 1100 includes performing, in response to failure of an integer ambiguity resolution validation check based on at least a first subset of the plurality of candidate float ambiguity values, an integer ambiguity search using at least a second subset of the plurality of candidate float ambiguity values, wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values. For example, per the method 800, stage 860 (or stage 880) may be performed using a subset of candidate float ambiguity values corresponding to SPS signals each with at least a threshold CN0 value that is higher than a CN0 threshold value used at stage 840 (or stage 860) to determine the candidate float ambiguity values to use in an ambiguity search. As another example, per the method 800, stage 840 may be performed using a subset of candidate float ambiguity values corresponding to SPS signals each with at least a threshold CN0 value whereas stage 810 was performed without using a threshold CN0 value to determine which candidate float ambiguity values to use to perform an ambiguity search. As another example, per the method 900, stage 940 (or stage 960 or stage 980) may be performed using a subset of candidate float ambiguity values corresponding to SPS signals from satellites each with at least a threshold elevation value that is higher than a threshold elevation used at stage 910 (or stage 940 or stage 960, respectively) to determine the candidate float ambiguity values to use in an ambiguity search. As another example, combinations of CN0 and satellite elevation thresholds may be used to determine subsets of candidate float ambiguity values to use for an ambiguity search. As another example, per the method 1000, a subset of candidate float ambiguity values may be determined based on which of the updated uncombined float ambiguities are within a threshold closeness of a respective integer. The processor 710, possibly in combination with the memory 730, may comprise means for performing the integer ambiguity search.

Implementations of the method 1100 may include one or more of the following features. In an example implementation, the second indication of candidate float ambiguity accuracy comprises an SPS signal carrier-to-noise ratio. For example, per the method 800, a cascading threshold of CN0 may be used to determine which candidate float ambiguity values to use for an ambiguity search. In another example, implementation, the second indication of candidate float ambiguity accuracy comprises an elevation angle of a respective one of the satellite sources. For example, per the method 900, a cascading threshold of satellite elevation corresponding to SPS signals may be used to determine which candidate float ambiguity values to use for an ambiguity search. In another example implementation, the second indication of candidate float ambiguity accuracy comprises a combination of an SPS signal carrier-to-noise ratio and an elevation angle of a respective one of the satellite sources. For example, a combination of CN0 and satellite elevation may be used to determine which candidate float ambiguity values to use for an ambiguity search, with the value of CN0 and/or the value of satellite elevation being increased in response to lack of validation of ambiguity search results with previous values of CN0 and elevation used.

Also or alternatively, implementations of the method 1100 may include one or more of the following features. In an example implementation, the method 1100 further includes determining a plurality of combined-frequency integer values corresponding to combinations of SPS signals of the plurality of SPS signals, with each of the combinations of SPS signals corresponding to a plurality of frequency bands, wherein: determining the at least second subset of the plurality of candidate float ambiguity values comprises determining the at least second subset of the plurality of candidate float ambiguity values based on the plurality of combined-frequency integer values; and the second indication of the candidate float ambiguity accuracy comprises a closeness to a respective integer of each value of the at least second subset of the plurality of candidate float ambiguity values. For example, at stage 1015 of the method 1000, combined-frequency integer ambiguity values are determined from individual frequency band integer ambiguity values. These values may be used at stage 1022 to calculate the combined-frequency fixed integer vector 1025 that may be used at stage 1030 to calculate the combined-frequency fixed position 1035 that may be used to calculate updated uncombined float ambiguities at stage 1040. Which of the updated uncombined float ambiguities is within a threshold of a respective integer (e.g., different uncombined float ambiguities may be close to different integers) may be used to determine which candidate uncombined ambiguities to use in an ambiguity search at stage 1065. The processor 710, possibly in combination with the memory 730, may comprise means for determining the plurality of combined-frequency integer values corresponding to combinations of SPS signals of the plurality of SPS signals. In a further example implementation, the method 1100 further includes: determining a first position estimate for the mobile device based on the plurality of combined-frequency integer values; and determining updated individual-frequency-band float ambiguities based on the first position estimate for the mobile device, a second position estimate for the mobile device, and previous individual-frequency band float ambiguities; wherein determining the at least second subset of the plurality of candidate float ambiguity values comprises determining the at least second subset of the plurality of candidate float ambiguity values as the updated individual-frequency-band float ambiguities that are each within a closeness threshold of a respective integer in response to at least a threshold amount of the updated individual-frequency-band float ambiguities each being within the closeness threshold of the respective integer. For example, combined-frequency integer values (of the vector 1025) may be used to determine, at stage 1030, the combined-frequency fixed position 1035 and used at stage 1040 to calculate updated individual-frequency-band float ambiguities values. Which of the updated uncombined float ambiguities is within a threshold of a respective integer (e.g., different uncombined float ambiguities may be close to different integers) may be used to determine which candidate uncombined ambiguities to use in an ambiguity search at stage 1065. The processor 710, possibly in combination with the memory 730, may comprise means for determining the first position estimate for the mobile device and means for determining the updated individual-frequency-band float ambiguities.

Also or alternatively, implementations of the method 1100 may include one or more of the following features. In an example implementation, the method 1100 further includes: determining a plurality of combined-frequency integer values corresponding to combinations of SPS signals of the plurality of SPS signals, with each of the combinations of SPS signals corresponding to a plurality of frequency bands; determining a first position estimate for the mobile device based on the plurality of combined-frequency integer values; determining updated individual-frequency-band float ambiguities based on the first position estimate for the mobile device, a second position estimate for the mobile device, and previous individual-frequency band float ambiguities; and updating the second position estimate for the mobile device with a third position estimate for the mobile device determined based on the plurality of combined-frequency integer values and the second position estimate for the mobile device and the previous individual-frequency band float ambiguities in response to at least a threshold amount of the updated individual-frequency-band float ambiguities each being within a closeness threshold of a respective integer. For example, at stage 1015 of the method 1000, combined-frequency integer ambiguity values are determined from individual frequency band integer ambiguity values. These values may be used at stage 1022 to calculate the combined-frequency fixed integer vector 1025 that may be used at stage 1030 to calculate the combined-frequency fixed position 1035 that may be used to calculate updated uncombined float ambiguities at stage 1040. In response to at least the threshold amount of the updated uncombined float ambiguity values being with a threshold closeness of respective integers, the combined-frequency ambiguity values may be used in an ambiguity search to fix these values to integer values, i.e., combined-frequency-fixed integer values. Further, the combined-frequency-fixed integer values and the updated EKF state and covariance (e.g., determined at stage 1040 and including a position estimate and integer ambiguity values) may be used at stage 1055 to determine the combined-frequency-fixed EKF state and covariance 1065 including a combined-frequency-fixed position estimate which may replace the position estimate of the EKF state and covariance 1010. The processor 710, possibly in combination with the memory 730, may comprise means for determining the plurality of combined-frequency integer ambiguity values, means for determining the first position estimate, means for determining the updated individual-frequency-band float ambiguities, and means for updating the second position estimate for the mobile device with the third position estimate for the mobile device.

Implementation Examples

Implementation examples are provided in the following numbered clauses.

Clause 1. A mobile device comprising:
a satellite positioning system receiver configured to receive a plurality of satellite positioning system (SPS) signals;
a memory; and
a processor communicatively coupled to the satellite positioning system receiver and the memory, wherein the processor is configured to:
determine, for the plurality of SPS signals, a plurality of candidate float ambiguity values indicative of float numbers of carrier signal wavelengths of the plurality of SPS signals between respective satellite sources, of the plurality of SPS signals, and the mobile device; and
perform, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

Clause 2. The mobile device of clause 1, wherein the second indication of candidate float ambiguity accuracy comprises an SPS signal carrier-to-noise ratio.

Clause 3. The mobile device of clause 1, wherein the second indication of candidate float ambiguity accuracy comprises an elevation angle of a respective one of the satellite sources.

Clause 4. The mobile device of clause 1, wherein the second indication of candidate float ambiguity accuracy comprises a combination of an SPS signal carrier-to-noise ratio and an elevation angle of a respective one of the satellite sources.

Clause 5. The mobile device of clause 1, wherein the processor is configured to:
determine a plurality of combined-frequency integer values corresponding to combinations of SPS signals of the plurality of SPS signals, with each of the combinations of SPS signals corresponding to a plurality of frequency bands; and
determine the at least second subset of the plurality of candidate float ambiguity values based on the plurality of combined-frequency integer values;

wherein the second indication of the candidate float ambiguity accuracy comprises a closeness to a respective integer of each value of the at least second subset of the plurality of candidate float ambiguity values.

Clause 6. The mobile device of clause 5, wherein the processor is configured to:
determine a first position estimate for the mobile device based on the plurality of combined-frequency integer values; and
determine updated individual-frequency-band float ambiguities based on the first position estimate for the mobile device, a second position estimate for the mobile device, and previous individual-frequency band float ambiguities; and
determine the at least second subset of the plurality of candidate float ambiguity values as the updated individual-frequency-band float ambiguities that are each within a closeness threshold of a respective integer in response to at least a threshold amount of the updated individual-frequency-band float ambiguities each being within the closeness threshold of the respective integer.

Clause 7. The mobile device of clause 1, wherein the processor is configured to:
determine a plurality of combined-frequency integer values corresponding to combinations of SPS signals of the plurality of SPS signals, with each of the combinations of SPS signals corresponding to a plurality of frequency bands;
determine a first position estimate for the mobile device based on the plurality of combined-frequency integer values;
determine updated individual-frequency-band float ambiguities based on the first position estimate for the mobile device, a second position estimate for the mobile device, and previous individual-frequency band float ambiguities; and
update the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

Clause 8. An integer ambiguity resolution method comprising:
receiving, at a mobile device, a plurality of satellite positioning system (SPS) signals;
determining, for the plurality of SPS signals, a plurality of candidate float ambiguity values indicative of float numbers of carrier signal wavelengths of the plurality of SPS signals between respective satellite sources, of the plurality of SPS signals, and the mobile device; and
performing, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

Clause 9. The integer ambiguity resolution method of clause 8, wherein the second indication of candidate float ambiguity accuracy comprises an SPS signal carrier-to-noise ratio.

Clause 10. The integer ambiguity resolution method of clause 8, wherein the second indication of candidate float ambiguity accuracy comprises an elevation angle of a respective one of the satellite sources.

Clause 11. The integer ambiguity resolution method of clause 8, wherein the second indication of candidate float ambiguity accuracy comprises a combination of an SPS signal carrier-to-noise ratio and an elevation angle of a respective one of the satellite sources.

Clause 12. The integer ambiguity resolution method of clause 8, further comprising determining a plurality of combined-frequency integer values corresponding to combinations of SPS signals of the plurality of SPS signals, with each of the combinations of SPS signals corresponding to a plurality of frequency bands, wherein:
determining the at least second subset of the plurality of candidate float ambiguity values comprises determining the at least second subset of the plurality of candidate float ambiguity values based on the plurality of combined-frequency integer values; and
the second indication of the candidate float ambiguity accuracy comprises a closeness to a respective integer of each value of the at least second subset of the plurality of candidate float ambiguity values.

Clause 13. The integer ambiguity resolution method of clause 12, further comprising:
determining a first position estimate for the mobile device based on the plurality of combined-frequency integer values; and
determining updated individual-frequency-band float ambiguities based on the first position estimate for the mobile device, a second position estimate for the mobile device, and previous individual-frequency band float ambiguities;
wherein determining the at least second subset of the plurality of candidate float ambiguity values comprises determining the at least second subset of the plurality of candidate float ambiguity values as the updated individual-frequency-band float ambiguities that are each within a closeness threshold of a respective integer in response to at least a threshold amount of the updated individual-frequency-band float ambiguities each being within the closeness threshold of the respective integer.

Clause 14. The integer ambiguity resolution method of clause 8, further comprising:
determining a plurality of combined-frequency integer values corresponding to combinations of SPS signals of the plurality of SPS signals, with each of the combinations of SPS signals corresponding to a plurality of frequency bands;
determining a first position estimate for the mobile device based on the plurality of combined-frequency integer values;
determining updated individual-frequency-band float ambiguities based on the first position estimate for the mobile device, a second position estimate for the mobile device, and previous individual-frequency band float ambiguities; and
updating the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

Clause 15. A mobile device comprising:
means for receiving a plurality of satellite positioning system (SPS) signals;
means for determining, for the plurality of SPS signals, a plurality of candidate float ambiguity values indicative of float numbers of carrier signal wavelengths of the plurality of SPS signals between respective satellite sources, of the plurality of SPS signals, and the mobile device; and
means for performing, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

Clause 16. The mobile device of clause 15, wherein the second indication of candidate float ambiguity accuracy comprises an SPS signal carrier-to-noise ratio.

Clause 17. The mobile device of clause 15, wherein the second indication of candidate float ambiguity accuracy comprises an elevation angle of a respective one of the satellite sources.

Clause 18. The mobile device of clause 15, wherein the second indication of candidate float ambiguity accuracy comprises a combination of an SPS signal carrier-to-noise ratio and an elevation angle of a respective one of the satellite sources.

Clause 19. The mobile device of clause 15, further comprising means for determining a plurality of combined-frequency integer values corresponding to combinations of SPS signals of the plurality of SPS signals, with each of the combinations of SPS signals corresponding to a plurality of frequency bands, wherein:
the means for determining the at least second subset of the plurality of candidate float ambiguity values comprise means for determining the at least second subset of the plurality of candidate float ambiguity values based on the plurality of combined-frequency integer values; and
the second indication of the candidate float ambiguity accuracy comprises a closeness to a respective integer of each value of the at least second subset of the plurality of candidate float ambiguity values.

Clause 20. The mobile device of clause 19, further comprising:
means for determining a first position estimate for the mobile device based on the plurality of combined-frequency integer values; and
means for determining updated individual-frequency-band float ambiguities based on the first position estimate for the mobile device, a second position estimate for the mobile device, and previous individual-frequency band float ambiguities;
wherein the means for determining the at least second subset of the plurality of candidate float ambiguity values comprise means for determining the at least second subset of the plurality of candidate float ambiguity values as the updated individual-frequency-band float ambiguities that are each within a closeness threshold of a respective integer in response to at least a threshold amount of the updated individual-frequency-band float ambiguities each being within the closeness threshold of the respective integer.

Clause 21. The mobile device of clause 15, further comprising:
means for determining a plurality of combined-frequency integer values corresponding to combinations of SPS signals of the plurality of SPS signals, with each of the combinations of SPS signals corresponding to a plurality of frequency bands;
means for determining a first position estimate for the mobile device based on the plurality of combined-frequency integer values;
means for determining updated individual-frequency-band float ambiguities based on the first position estimate for the mobile device, a second position estimate for the mobile device, and previous individual-frequency band float ambiguities; and
means for updating the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

Clause 22. A non-transitory, processor-readable storage medium comprising processor-readable instructions to cause one or more processors of a mobile device to:
receive a plurality of satellite positioning system (SPS) signals;
determine, for the plurality of SPS signals, a plurality of candidate float ambiguity values indicative of float numbers of carrier signal wavelengths of the plurality of SPS signals between respective satellite sources, of the plurality of SPS signals, and the mobile device; and
perform, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values.

Clause 23. The non-transitory, processor-readable storage medium of clause 22, wherein the second indication of candidate float ambiguity accuracy comprises an SPS signal carrier-to-noise ratio.

Clause 24. The non-transitory, processor-readable storage medium of clause 22, wherein the second indication of candidate float ambiguity accuracy comprises an elevation angle of a respective one of the satellite sources.

Clause 25. The non-transitory, processor-readable storage medium of clause 22, wherein the second indication of candidate float ambiguity accuracy comprises a combination of an SPS signal carrier-to-noise ratio and an elevation angle of a respective one of the satellite sources.

Clause 26. The non-transitory, processor-readable storage medium of clause 22, further comprising processor-readable instructions to cause the one or more processors to determine a plurality of combined-frequency integer values corresponding to combinations of SPS signals of the plurality of SPS signals, with each of the combinations of SPS signals corresponding to a plurality of frequency bands, wherein:
  the processor-readable instructions to cause the one or more processors to determine the at least second subset of the plurality of candidate float ambiguity values comprise processor-readable instructions to cause the one or more processors to determine the at least second subset of the plurality of candidate float ambiguity values based on the plurality of combined-frequency integer values; and
  the second indication of the candidate float ambiguity accuracy comprises a closeness to a respective integer of each value of the at least second subset of the plurality of candidate float ambiguity values.

Clause 27. The non-transitory, processor-readable storage medium of clause 26, further comprising processor-readable instructions to cause the one or more processors to:
  determine a first position estimate for the mobile device based on the plurality of combined-frequency integer values; and
  determine updated individual-frequency-band float ambiguities based on the first position estimate for the mobile device, a second position estimate for the mobile device, and previous individual-frequency band float ambiguities;
  wherein the processor-readable instructions to cause the one or more processors to determine the at least second subset of the plurality of candidate float ambiguity values comprise processor-readable instructions to cause the one or more processors to determine the at least second subset of the plurality of candidate float ambiguity values as the updated individual-frequency-band float ambiguities that are each within a closeness threshold of a respective integer in response to at least a threshold amount of the updated individual-frequency-band float ambiguities each being within the closeness threshold of the respective integer.

Clause 28. The non-transitory, processor-readable storage medium of clause 22, further comprising processor-readable instructions to cause the one or more processors to:
  determine a plurality of combined-frequency integer values corresponding to combinations of SPS signals of the plurality of SPS signals, with each of the combinations of SPS signals corresponding to a plurality of frequency bands;
  determine a first position estimate for the mobile device based on the plurality of combined-frequency integer values;
  determine updated individual-frequency-band float ambiguities based on the first position estimate for the mobile device, a second position estimate for the mobile device, and previous individual-frequency band float ambiguities; and
  update the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

OTHER CONSIDERATIONS

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection, between wireless communication devices. A wireless communication system (also called a wireless communications system, a wireless communication network, or a wireless communications network) may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description herein to provide a thorough understanding of example configurations (including implementations). However, configurations may be practiced without these specific details. For example, well-known circuits, processes, algorithms, structures, and techniques have been shown without unnecessary detail in order to avoid obscuring the configurations. The description herein provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:
1. A mobile device comprising:
a satellite positioning system receiver configured to receive a plurality of satellite positioning system (SPS) signals;
a memory; and
a processor communicatively coupled to the satellite positioning system receiver and the memory, wherein the processor is configured to:
  determine, for the plurality of SPS signals, a plurality of candidate float ambiguity values indicative of float numbers of carrier signal wavelengths of the plurality of SPS signals between respective satellite sources, of the plurality of SPS signals, and the mobile device;
  perform, in response to failure of an integer ambiguity resolution validation check based on at least a first subset of the plurality of candidate float ambiguity values, an integer ambiguity search using at least a second subset of the plurality of candidate float ambiguity values;
  wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values;
  determine a plurality of combined-frequency integer values corresponding to combinations of SPS signals of the plurality of SPS signals, with each of the combinations of SPS signals corresponding to a plurality of frequency bands;
determine a first position estimate for the mobile device based on the plurality of combined-frequency integer values;
determine updated individual-frequency-band float ambiguities based on the first position estimate for the mobile device, a second position estimate for the mobile device, and previous individual-frequency band float ambiguities; and
update the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

2. The mobile device of claim 1, wherein the second indication of candidate float ambiguity accuracy comprises an SPS signal carrier-to-noise ratio.

3. The mobile device of claim 1, wherein the second indication of candidate float ambiguity accuracy comprises an elevation angle of a respective one of the satellite sources.

4. The mobile device of claim 1, wherein the second indication of candidate float ambiguity accuracy comprises a combination of an SPS signal carrier-to-noise ratio and an elevation angle of a respective one of the satellite sources.

5. An integer ambiguity resolution method comprising:
receiving, at a mobile device, a plurality of satellite positioning system (SPS) signals;
determining, for the plurality of SPS signals, a plurality of candidate float ambiguity values indicative of float numbers of carrier signal wavelengths of the plurality of SPS signals between respective satellite sources, of the plurality of SPS signals, and the mobile device;
performing, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values;
determining a plurality of combined-frequency integer values corresponding to combinations of SPS signals of the plurality of SPS signals, with each of the combinations of SPS signals corresponding to a plurality of frequency bands;
determining a first position estimate for the mobile device based on the plurality of combined-frequency integer values;
determining updated individual-frequency-band float ambiguities based on the first position estimate for the mobile device, a second position estimate for the mobile device, and previous individual-frequency band float ambiguities; and
updating the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

6. The integer ambiguity resolution method of claim 5, wherein the second indication of candidate float ambiguity accuracy comprises an SPS signal carrier-to-noise ratio.

7. The integer ambiguity resolution method of claim 5, wherein the second indication of candidate float ambiguity accuracy comprises an elevation angle of a respective one of the satellite sources.

8. The integer ambiguity resolution method of claim 5, wherein the second indication of candidate float ambiguity accuracy comprises a combination of an SPS signal carrier-to-noise ratio and an elevation angle of a respective one of the satellite sources.

9. A mobile device comprising:
means for receiving a plurality of satellite positioning system (SPS) signals;
means for determining, for the plurality of SPS signals, a plurality of candidate float ambiguity values indicative of float numbers of carrier signal wavelengths of the plurality of SPS signals between respective satellite sources, of the plurality of SPS signals, and the mobile device;
means for performing, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values;
means for determining a plurality of combined-frequency integer values corresponding to combinations of SPS signals of the plurality of SPS signals, with each of the combinations of SPS signals corresponding to a plurality of frequency bands;
means for determining a first position estimate for the mobile device based on the plurality of combined-frequency integer values;
means for determining updated individual-frequency-band float ambiguities based on the first position estimate for the mobile device, a second position estimate for the mobile device, and previous individual-frequency band float ambiguities; and
means for updating the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

10. The mobile device of claim 9, wherein the second indication of candidate float ambiguity accuracy comprises an SPS signal carrier-to-noise ratio.

11. The mobile device of claim 9, wherein the second indication of candidate float ambiguity accuracy comprises an elevation angle of a respective one of the satellite sources.

12. The mobile device of claim 9, wherein the second indication of candidate float ambiguity accuracy comprises a combination of an SPS signal carrier-to-noise ratio and an elevation angle of a respective one of the satellite sources.

13. A non-transitory, processor-readable storage medium comprising processor-readable instructions to cause one or more processors of a mobile device to:
receive a plurality of satellite positioning system (SPS) signals;
determine, for the plurality of SPS signals, a plurality of candidate float ambiguity values indicative of float numbers of carrier signal wavelengths of the plurality of SPS signals between respective satellite sources, of the plurality of SPS signals, and the mobile device;
perform, in response to failure of an integer ambiguity resolution validation check based on at least a first subset of the plurality of candidate float ambiguity values, an integer ambiguity search using at least a second subset of the plurality of candidate float ambiguity values;
wherein each candidate float ambiguity value of the at least second subset of the plurality of candidate float ambiguity values corresponds to a second indication of candidate float ambiguity accuracy that is higher than a first indication of candidate float ambiguity accuracy, if any, corresponding to the at least first subset of the plurality of candidate float ambiguity values;
determine a plurality of combined-frequency integer values corresponding to combinations of SPS signals of the plurality of SPS signals, with each of the combinations of SPS signals corresponding to a plurality of frequency bands;
determine a first position estimate for the mobile device based on the plurality of combined-frequency integer values;
determine updated individual-frequency-band float ambiguities based on the first position estimate for the mobile device, a second position estimate for the mobile device, and previous individual-frequency band float ambiguities; and
update the second position estimate for the mobile device with a third position estimate for the mobile device determined based on the plurality of combined-frequency integer values and the second position estimate for the mobile device and the previous individual-frequency band float ambiguities and in response to at least a threshold amount of the updated individual-frequency-band float ambiguities each being within a closeness threshold of a respective integer.

14. The non-transitory, processor-readable storage medium of claim 13, wherein the second indication of candidate float ambiguity accuracy comprises an SPS signal carrier-to-noise ratio.

15. The non-transitory, processor-readable storage medium of claim 13, wherein the second indication of candidate float ambiguity accuracy comprises an elevation angle of a respective one of the satellite sources.

16. The non-transitory, processor-readable storage medium of claim 13, wherein the second indication of candidate float ambiguity accuracy comprises a combination of an SPS signal carrier-to-noise ratio and an elevation angle of a respective one of the satellite sources.

* * * * *